(12) United States Patent
Park et al.

(10) Patent No.: US 12,135,559 B2
(45) Date of Patent: Nov. 5, 2024

(54) ROBOT AND OPERATING METHOD THEREOF

(71) Applicant: SAMSUNG ELECTRONICS CO., LTD., Suwon-si (KR)

(72) Inventors: Sanghyuk Park, Suwon-si (KR); Heesuk Yoon, Suwon-si (KR); Kiyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 207 days.

(21) Appl. No.: 17/869,490

(22) Filed: Jul. 20, 2022

(65) Prior Publication Data

US 2023/0102490 A1 Mar. 30, 2023

Related U.S. Application Data

(63) Continuation of application No. PCT/KR2022/008868, filed on Jun. 22, 2022.

(30) Foreign Application Priority Data

Sep. 28, 2021 (KR) .................. 10-2021-0128344

(51) Int. Cl.
*G05D 1/00* (2024.01)
*B60L 53/67* (2019.01)
*G05D 1/661* (2024.01)

(52) U.S. Cl.
CPC ............ *G05D 1/0225* (2013.01); *B60L 53/67* (2019.02); *G05D 1/661* (2024.01)

(58) Field of Classification Search
None
See application file for complete search history.

(56) References Cited

U.S. PATENT DOCUMENTS

| 5,220,263 A | 6/1993 | Onishi et al. |
| 8,390,251 B2 | 3/2013 | Cohen et al. |

(Continued)

FOREIGN PATENT DOCUMENTS

| EP | 1759965 A1 | 3/2007 |
| JP | 2007-316730 | 12/2007 |

(Continued)

OTHER PUBLICATIONS

International Search Report and Written Opinion dated Sep. 23, 2022 in PCT Application No. PCT/KR2022/008868.

(Continued)

*Primary Examiner* — Todd Melton
(74) *Attorney, Agent, or Firm* — STAAS & HALSEY LLP

(57) ABSTRACT

A robot includes; a driving module, a communication module, and at least one processor configured to receive, a second docking guidance signal output from a second docking station; determine a first output time of the received second docking guidance signal, determine a second output time of a first docking guidance request signal to be transmitted based on the determined first output time to prevent the first docking guidance request signal from overlapping with the second docking guidance signal, and output the first docking guidance request signal, through the communication module, based on the determined second output time of the first docking guidance request signal, and in response to the outputting of the first docking guidance request signal, receive, a first docking guidance signal, docking the robot to the first docking station by driving the driving module in response to receiving the first docking guidance signal.

15 Claims, 16 Drawing Sheets

(56) References Cited

U.S. PATENT DOCUMENTS

| | | | |
|---|---|---|---|
| 10,048,695 B2 | 8/2018 | Hoshino | |
| 10,602,898 B2 * | 3/2020 | Scholten et al. | |
| 10,642,277 B2 * | 5/2020 | Diehr | G05D 1/0225 |
| 10,893,787 B2 * | 1/2021 | Dubrovsky | G05D 1/0016 |
| 11,497,368 B2 * | 11/2022 | Kim | A47L 9/2852 |
| 2007/0050937 A1 | 3/2007 | Song et al. | |
| 2016/0309974 A1 | 10/2016 | Abe et al. | |
| 2022/0147057 A1 | 5/2022 | Kwak et al. | |

FOREIGN PATENT DOCUMENTS

| | | |
|---|---|---|
| JP | 2015-132893 | 7/2015 |
| JP | 2016-51913 | 4/2016 |
| KR | 10-2007-0078846 | 8/2007 |
| KR | 10-2019-0003159 | 1/2019 |
| KR | 10-2020-0029969 | 3/2020 |
| KR | 10-2020-0029970 | 3/2020 |
| KR | 10-2300790 | 9/2021 |
| WO | WO 2010/064989 A1 | 6/2010 |

OTHER PUBLICATIONS

Supplementary European Search Report dated Sep. 19, 2024 issued in EP 22 87 6620.

\* cited by examiner

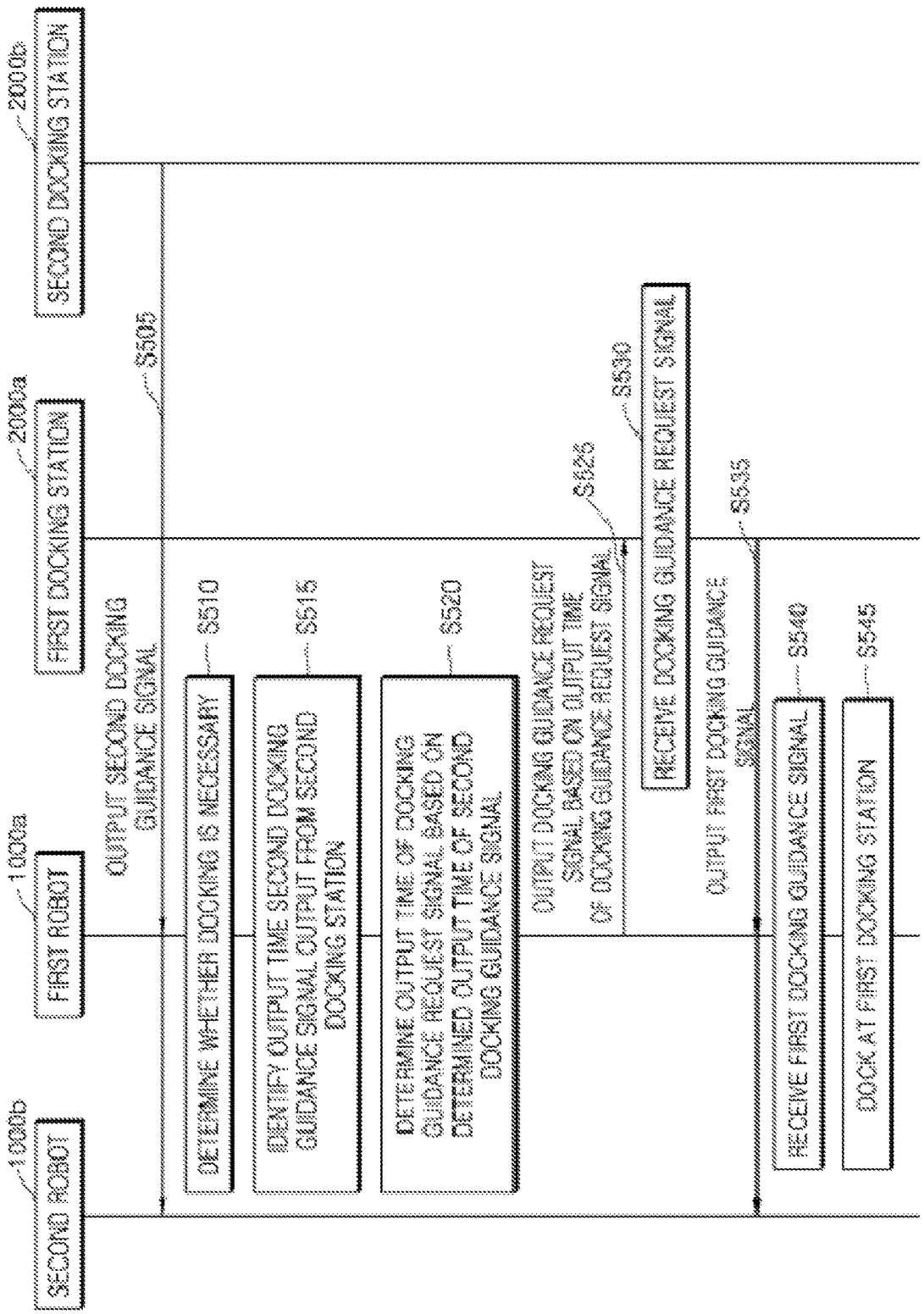

ROBOT AND OPERATING METHOD THEREOF

CROSS-REFERENCE TO RELATED APPLICATION(S)

This application is a continuation application, under 35 U.S.C. § 111(a), of international application No. PCT/KR2022/008868, filed Jun. 22, 2022, which is based on and claims priority under 35 U.S.C. § 119 to Korean Patent Application No. 10-2021-0128344, filed on Sep. 28, 2021 in the Korean Intellectual Property Office, the disclosures of which are incorporated herein by reference.

BACKGROUND

1. Field

The disclosure relates to a robot and an operating method thereof. In particular, the disclosure relates to a method of docking a robot at a docking station, and a robot that is docked.

2. Description of Related Art

As robot technology develops, various robots are increasingly used in real life. For example, robots used in real life may include vacuum cleaner robots, wet mop cleaner robots, serving robots, air purification robots, and child-rearing robots.

As these robots move continuously, the robots require a separate charging time and are designed to be automatically charged by being docked at their own docking station.

However, most robots using automatic docking use a wireless signal having a similar wavelength band when docking. Accordingly, when there are multiple robots and multiple docking stations respectively corresponding to the robots in one space, interference occurs between docking guidance signals, and in this case, the robots may not be able to return to the docking stations for charging.

Furthermore, when there are multiple robots and multiple docking stations respectively corresponding to the robots in one space, each robot needs to determine whether a received docking guidance signal is a signal output from its own docking station.

A method of accurately docking a robot at its own docking station is required.

SUMMARY

Provided are a robot that is docked at a docking station and a docking method thereof. According to an embodiment of the disclosure, a robot includes a driving module, a communication module, and at least one processor configured to receive, through the communication module, a second docking guidance signal output from a second docking station, determine a first output time of the received second docking guidance, determine a second output time of a first docking guidance request signal to be transmitted from the robot based on the determined first output time to prevent the first docking guidance request signal from overlapping with the second docking guidance signal, and output the first docking guidance request signal, through the communication module, based on the determined second output time of the first docking guidance request signal, and in response to the outputting of the first docking guidance request signal from the robot, receive, through the communication module, a first docking guidance signal from the first docking station, by driving the driving module in response to receiving the first docking guidance signal.

The at least one processor is further configured to determine a period of the second docking guidance signal, and output the first docking guidance request signal in a time interval of the period in which the second docking guidance signal is not output to prevent the first docking guidance request signal from overlapping with the second docking guidance signal.

The at least one processor is further configured to determine the second output time of the first docking guidance request signal to prevent the first docking guidance request signal from the robot and the received first docking guidance signal from the first docking station from overlapping with the second docking guidance signal that is output.

Each of the first docking guidance request signal from the robot and the first docking guidance signal from the first docking station comprises identification information used to dock the robot to the first docking station.

The first docking guidance request signal is identified as a signal output by the robot based on the identification information.

In response to the receiving of the first docking guidance signal including the identification information by the robot, the first docking guidance signal is identified as a signal output from the first docking station based on the identification information.

The first docking guidance signal comprises an infrared signal, and the identification information is included in at least one of a leader signal indicating a start of the infrared signal or a data signal indicating data, of the infrared signal.

The identification information is set in the robot through a mobile device that controls the robot.

The at least one processor is further configured to determine a docking of a second robot to the second docking station based on whether the second docking guidance signal is output or not, and when the second robot is determined as being docked at the second docking station, output the first docking guidance request signal.

The first docking station comprises a plurality of docking portions to respectively dock the robot and the second robot thereto.

According to an embodiment of the disclosure, a method of docking a robot at a docking station comprises determining a first output time of a second docking guidance signal that is output from a second docking station; determining a second output time of a first docking guidance request signal to be transmitted from the robot based on the determined first output time to prevent the first docking guidance request signal from overlapping with the second docking guidance signal; outputting the first docking guidance request signal from a first robot based on the determined second output time of the first docking guidance request signal; in response to the outputting of the first docking guidance request signal from the first robot, receiving a first docking guidance signal from a first docking station; docking the first robot to the first docking station in response to the receiving of the first docking guidance signal.

The determining of the second output time of the first docking guidance request signal comprises determining a period of the second docking guidance signal, and outputting the first docking guidance request signal in a time interval of the period in which the second docking guidance signal is not output to prevent the first docking guidance request signal from overlapping with the second docking guidance signal.

The determining of the second output time of the docking guidance request signal t comprises determining the second output time of the first docking guidance request signal to prevent the first docking guidance request signal from the first robot to be output and the received first docking guidance signal from the first docking station from overlapping with the second docking guidance signal that is output.

Each of the first docking guidance request signal from the first robot and the first docking guidance signal from the first docking station comprises identification information used to dock the robot to the first docking station.

The first docking guidance request signal is identified as a signal output by the first robot based on the identification information.

The method further comprises in response to the receiving of the first docking guidance signal including the identification information by the first robot, identifying, based on the identification information, the first docking guidance signal as a signal output from the first docking station.

The first docking guidance signal comprises an infrared signal, and the identification information is included in at least one of a leader signal indicating a start of the infrared signal or a data signal indicating data, of the infrared signal.

The method further comprises further comprising setting the identification information in the first robot through a mobile device that controls the first robot.

The determining of the second output time of the first docking guidance request signal comprises: determining a docking of a second robot to the second docking station based on whether the second docking guidance signal is output or not; and determining a time after the second robot is docked at the second docking station, as a time to output the first docking guidance request signal.

The first docking station comprises a plurality of docking portions to respectively dock the first robot and the second robot thereto.

Furthermore, according to another embodiment of the disclosure, a method of docking a robot at a docking station includes determining an output time of a second docking guidance signal that is output from a second docking station, determining an output time of a docking guidance request signal to prevent the docking guidance request signal to be output by the robot from overlapping the second docking guidance signal that is output, outputting the docking guidance request signal based on the determined output time of the docking guidance request signal, and as a first docking station outputs a first docking guidance signal in response to the reception of the docking guidance request signal, docking at the first docking station based on the first docking guidance signal that is output.

BRIEF DESCRIPTION OF DRAWINGS

FIG. 5 is a flowchart of a method of docking a robot at a docking station in consideration of ambient signals, according to an embodiment of the disclosure.

DETAILED DESCRIPTION

Figure 1:
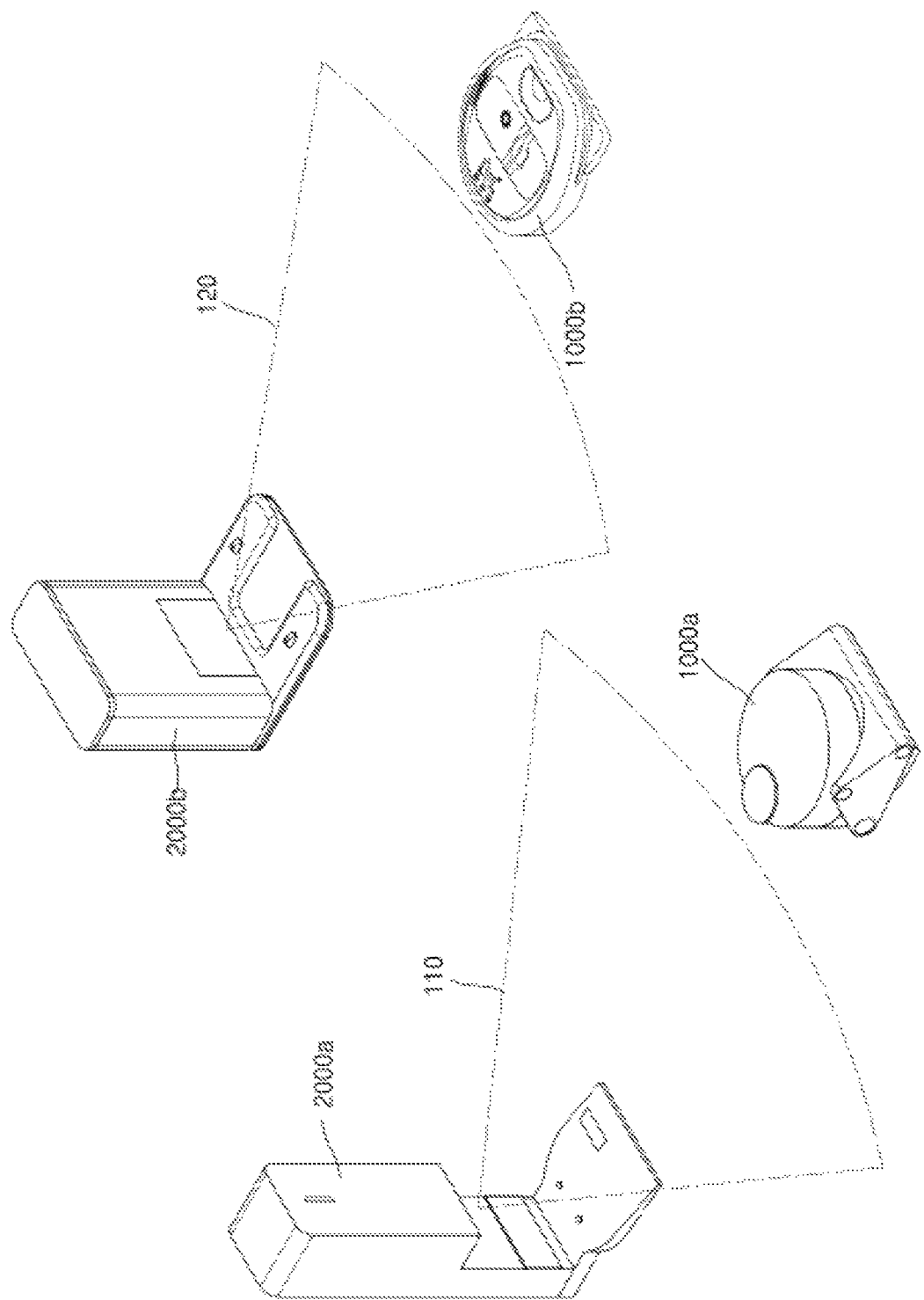
FIG. 1 illustrates a method of docking a robot at a docking station, according to an embodiment of the disclosure.

In the disclosure, expressions such as "at least one of a, b, or c" may denote "a", "b", "c", "a and b", "a and c", "b and c", "all of a, b, and c", or modifications thereof.

Hereinafter, the disclosure will be described more fully with reference to the accompanying drawings, in which embodiments of the disclosure are shown. This disclosure may, however, be embodied in many different forms and should not be construed as limited to the embodiments of the disclosure set forth herein. Furthermore, in the drawings, a part that is not related to a description is omitted to clearly describe the disclosure and, throughout the specification, similar parts are referenced with similar reference numerals.

The terms used in the disclosure have been selected from currently widely used general terms in consideration of the functions in the disclosure. However, the terms may vary according to the intention of one of ordinary skill in the art, case precedents, and the advent of new technologies. Accordingly, the terms used in the disclosure are defined based on their meanings in relation to the contents discussed throughout the specification, not by their simple meanings.

Furthermore, while such terms as "first," "second," etc., may be used to describe various components, such components must not be limited to the above terms. The above terms are used only to distinguish one component from another.

Furthermore, terms used in the specification are used for explaining a specific embodiment, not for limiting the disclosure. Thus, an expression used in a singular form in the specification also includes the expression in its plural form unless clearly specified otherwise in context. Furthermore, in the specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

In the specification, expressions such as "in some embodiments" or "in an embodiment" appearing in various places in the specification do not necessarily indicate the same embodiment.

FIG. 1 illustrates a method of docking a robot at a docking station, according to an embodiment of the disclosure.

Referring to FIG. 1, two or more pairs of a robot and a docking station corresponding to the robot may be present in one space. For example, a first robot 1000a and a first docking station 2000a and a second robot 1000b and a second docking station 2000b may be present in one space.

The first docking station 2000a may output a first docking guidance signal for docking the first robot 1000a. Furthermore, the second docking station 2000b may output a second docking guidance signal for docking the second robot 1000b. The first docking guidance signal and the second docking guidance signal may be in a similar frequency range. Accordingly, when a coverage 110 of an output signal output by the first docking station 2000a overlaps a coverage 120 of an output signal output by the second docking station 2000b, the first and second docking guidance signals may be damaged.

Docking may mean that a robot is coupled to a docking station so that the docking station may charge the robot. For example, when a charging plug of the first or second robot 1000a or 1000b and a charging socket of the first or second docking station 2000a or 2000b are in contact with each other, the first or second robot 1000a or 1000b may be regarded to be docked at the first or second docking station 2000a or 2000b. Furthermore, according to an embodiment of the disclosure, when the first or second robot 1000a or 1000b includes a wireless charging portion and the first or second robot 1000a or 1000b moves within a range of receiving an electromagnetic guidance signal from the first or second docking station 2000a or 2000b, the first or second robot 1000a or 1000b may be regarded to be docked at the first or second docking station 2000a or 2000b.

According to an embodiment of the disclosure, the first or second robot 1000a or 1000b determines whether there is an interference signal. When the interference signal is present, the first or second robot 1000a or 1000b may transmit/receive a signal for docking at the first or second docking station 2000a or 2000b corresponding thereto by avoiding the interference signal. For example, the first robot 1000a may identify output times of signals output by the second robot 1000b and the second docking station 2000b by periodically detecting the received signals, and may transmit/receive signals for docking to/from the first docking station 2000a by avoiding the identified output time.

Furthermore, according to an embodiment of the disclosure, the first or second robot 1000a or 1000b may share identification information with the first or second docking station 2000a or 2000b thereof. For example, the first robot 1000a and the first docking station 2000a may share first identification information, and the second robot 1000b and the second docking station 2000b may share second identification information that is different from the first identification information.

The first or second robot 1000a or 1000b may distinguish, by using identification information corresponding thereto, a signal output by other robot or other docking station from a signal output by the first or second docking station 2000a or 2000b respectively corresponding thereto.

Figure 2:
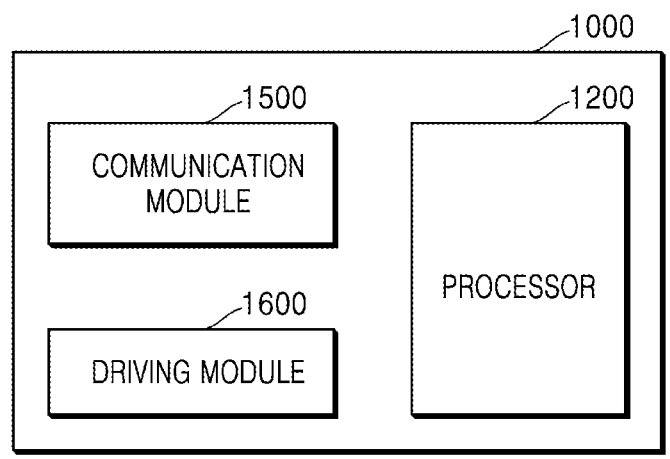
FIG. 2 is a block diagram of a robot according to an embodiment of the disclosure.

FIG. 2 is a block diagram of a robot according to an embodiment of the disclosure.

Referring to FIG. 2, a robot 1000 may include a communication module 1500, a driving module 1600, and a processor 1200.

The robot 1000 may correspond to robot devices such as a vacuum cleaner robot, a wet mop vacuum cleaner robot, a serving robot, an air purification robot, a child care robot, a housekeeping robot, an industrial robot, and the like.

The communication module 1500 may include a short-range communication module. For example, the communication module 1500 may include an infrared communication module, but the disclosure is not limited thereto. The robot 1000 may output a docking guidance request signal through the communication module 1500. Furthermore, the robot 1000 may receive a docking guidance signal through the communication module 1500.

Furthermore, the communication module 1500 may communicate with an external device in a wired or wireless manner. The communication module 1500 may access an AP device to transmit/receive a WiFi signal.

The communication module 1500 may perform short-range communication by using, for example, Bluetooth, Bluetooth low energy (BLE), near field communication, WLAN (WiFi), Zigbee, infrared data association (IrDA) communication, Wi-Fi direct (WFD), ultra wideband (UWB), Ant+ communication, and the like. Furthermore, the communication module 1500 may perform WLAN communication via an AP device.

In another example, the communication module 1500 may use mobile communication, and may transmit/receive a wireless signal with at least one of a base station, an external terminal, or a server on a mobile communication network.

The driving module 1600 may include elements for function and traveling of the robot 1000. For example, an element for function of the robot 1000 may include an absorbing portion for absorbing dust and the like, but the disclosure is not limited thereto. Furthermore, an element for traveling of the robot 1000 may include a wheel and a motor for rotating the wheel, but the disclosure is not limited thereto.

The processor 1200 may control the overall operation of the robot 1000. The processor 1200 may be implemented by one or more processors. The processor 1200 may perform a certain operation by executing instructions or commands stored in a memory.

Next, when the first robot 1000a, the second robot 1000b, the first docking station 2000a corresponding to the first robot 1000a, and the second docking station 2000b corresponding to the second robot 1000b are present in one space, and the second docking station 2000b output a second docking guidance signal, an operation of the processor 1200 to enable the first robot 1000a to be docked at the first docking station 2000a is described.

According to an embodiment of the disclosure, the processor 1200 included in the first robot 1000a may determine the output time of the second docking guidance signal output by the second docking station 2000b. For example, the processor 1200 may determine the output period of the second docking guidance signal. Furthermore, the processor 1200 may determine whether the second docking guidance signal is no longer output.

Furthermore, the processor 1200 may determine the output time of the docking guidance request signal to be output by the first robot 1000a to prevent the docking guidance request signal from overlapping the second docking guidance signal that is output.

Furthermore, the processor 1200 may output the docking guidance request signal through the communication module

1500, based on the determined output time of the docking guidance request signal. For example, the processor 1200 may output the docking guidance request signal through an infrared communication module (not shown), but the disclosure is not limited thereto.

Furthermore, as the first docking station 2000a, in response to the reception of the docking guidance request signal, outputs a first docking guidance signal, the processor 1200 may control the driving module 1600 based on the first docking guidance signal that is output, to dock the first robot 1000a at the first docking station 2000a.

The docking guidance signal may be a signal output by a docking station 2000 (see FIG. 4) to guide the docking of the robot 1000. The robot 1000 may determine, based on the docking guidance signal, the location of the docking station 2000 and the distance from the docking station 2000 to the robot 1000. The robot 1000 may return to and may be docked at the docking station 2000 based on the location and distance of the docking station 2000.

Figure 3:
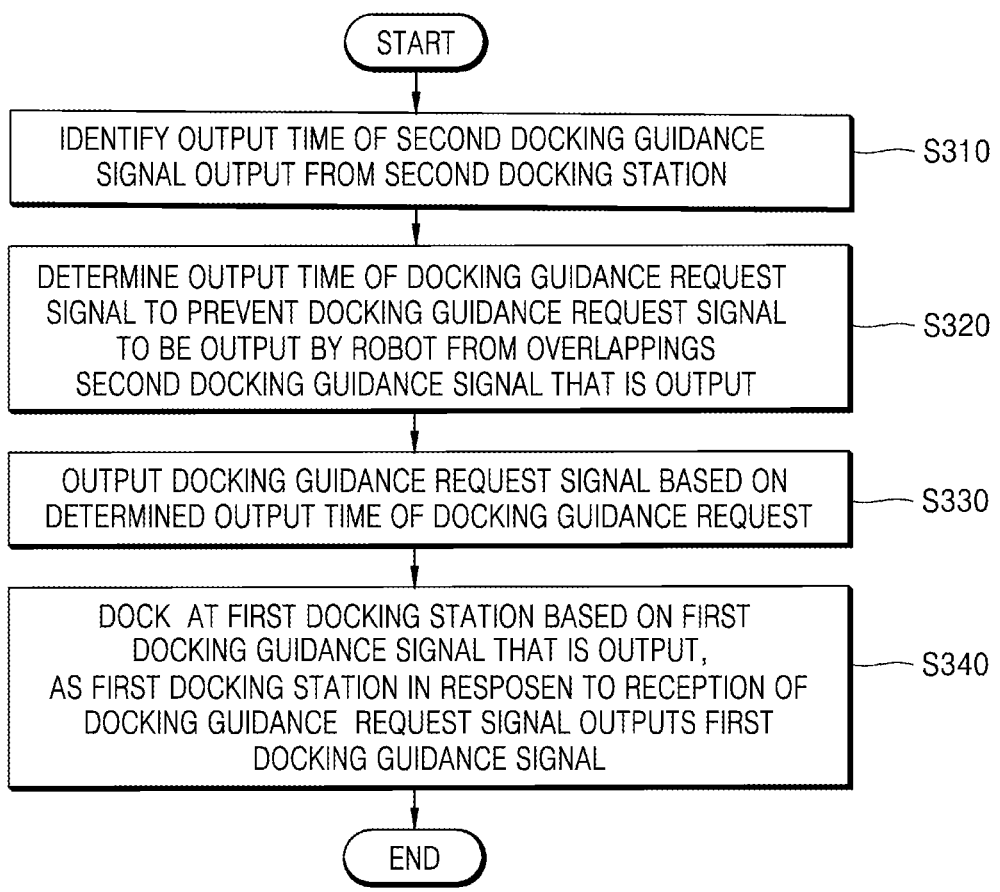
FIG. 3 is a flowchart of a method of docking a first robot at a docking station, according to an embodiment of the disclosure.

FIG. 3 is a flowchart of a method of docking a first robot at a docking station, according to an embodiment of the disclosure.

In operation S310, the first robot 1000a may identify the output time of the second docking guidance signal output from the second docking station 2000b.

The first robot 1000a may detect a received signal for a certain time, determine a pattern of the detected signal, and identify the output time of the received signal based on the determined pattern.

When the second docking station 2000b periodically outputs a docking guidance signal for docking the second robot 1000b, the first robot 1000a may identify the period of the second docking guidance signal.

For example, the first robot 1000a may identify the period of the second docking guidance signal, the duration of the second docking guidance signal, and the interval between the second docking guidance signals. Furthermore, in another example, the first robot 1000a may identify whether the second docking guidance signal is no longer output.

In operation S320, the first robot 1000a may determine the output time of the docking guidance request signal to prevent the docking guidance request signal to be output by the first robot 1000a from overlapping the second docking guidance signal that is output.

For example, the first robot 1000a may determine part of a section in which the second docking guidance signal is not output, as the output time of the docking guidance request signal, based on the period of the second docking guidance signal.

According to an embodiment of the disclosure, the first robot 1000a may determine the output time of the docking guidance request signal to prevent not only a docking guidance request signal to be output, but also a first docking guidance signal to be output from overlapping the second docking guidance signal.

Furthermore, in another embodiment of the disclosure, the first robot 1000a may determine whether the second robot 1000b is docked at the second docking station 2000b, based on whether the second docking guidance signal is output, and determine the time after the second robot 1000b is docked at the second docking station 2000b, as a time to output the docking guidance request signal.

The docking guidance request signal may be a signal to request the first docking station 2000a to output the docking guidance signal, as the first robot 1000a determines to perform docking.

In operation S330, the first robot 1000a may output a docking guidance request signal, based on the determined output time of the docking guidance request signal.

The docking guidance request signal may include first identification information shared between the first robot 1000a and the first docking station 2000a, to distinguish a first pair of the first robot 1000a and the first docking station 2000a from a second pair of the second robot 1000b and the second docking station 2000b.

Accordingly, the first docking station 2000a may identify that the docking guidance request signal is output by the first robot 1000a, based on the identification information included in the docking guidance request signal.

The first robot 1000a may output the docking guidance request signal once, or may periodically output the docking guidance request signal until a first docking guidance signal is received from the first docking station 2000a.

In operation S340, the first robot 1000a may be docked at the first docking station 2000a based on the first docking guidance signal that is output, as the first docking station 2000a in response to the reception of the docking guidance request signal outputs the first docking guidance signal.

The first docking guidance signal may include identification information shared between the first robot 1000a and the first docking station 2000a.

As the first robot 1000a receives the first docking guidance signal including the identification information, the first robot 1000a may identify the first docking guidance signal is output by the first docking station 2000a, based on the identification information.

The identification information may be included in at least one leader signal indicating the start of an infrared signal and a data signal indicating data among the infrared signal.

Accordingly, when the first identification information is detected from the leader signal or data signal in the received signal, the first robot 1000a may determine that the received signal is the first docking guidance signal output from the first docking station 2000a.

The identification information may be set in the first robot 1000a through a mobile device capable of controlling the first robot 1000a.

The first docking station 2000a may be a docking station including a plurality of docking parts for docking a plurality of robots 1000.

Figure 4:
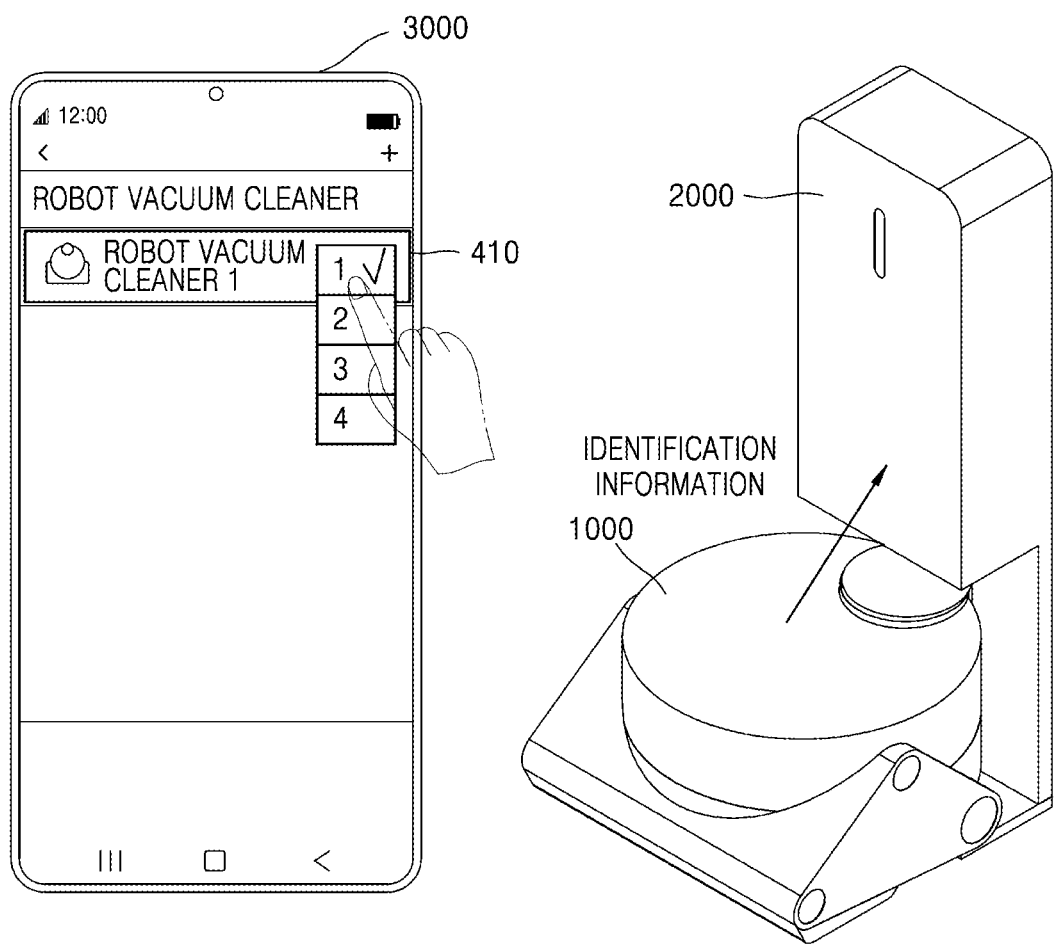
FIG. 4 illustrates a method of setting identification information in a robot and a docking station, according to an embodiment of the disclosure.

FIG. 4 illustrates a method of setting identification information in a robot and a docking station, according to an embodiment of the disclosure.

Referring to FIG. 4, identification information may be set in the robot 1000 by using a device 3000 capable of controlling the robot 1000. The robot 1000 may exchange data with the device 3000 through a server (not shown), or may transmit/receive data directly through short-range communication with the device 3000. The robot 1000 may communicate the server via the AP device.

The device 3000 may set information in the robot 1000 or provide a menu for controlling the robot 1000. For example, the device 3000 may provide a menu 410 to set identification information to be shared between the robot 1000 and the docking station 2000.

In response to the reception of a user input of selecting the menu 410 to set the identification information, the device 3000 may display pieces of identification information that are settable. In response to the reception of a user input of selecting one of the pieces of identification information that are displayed, the device 3000 may transmit the selected identification information to the robot 1000, as the identification information to be shared between the robot 1000 and the docking station 2000.

Furthermore, according to an embodiment of the disclosure, the device 3000 may receive a user input of inputting identification information, not a user input of selecting one of predetermined identification information.

After the identification information to be shared between the robot 1000 and the docking station 2000 is transmitted to the robot 1000, the robot 1000 may store the received identification information as the identification information to be shared with the docking station 2000. Furthermore, the robot 1000 may share the identification information with the docking station 2000.

According to an embodiment of the disclosure, the robot 1000 may share the identification information with the docking station 2000 using short-range communication. For example, the robot 1000 and the docking station 2000 may be provided with a button (not shown) for a function of sharing the identification information. In response to the reception of a user input of pressing the button provided in the robot 1000, the robot 1000 may transmit the identification information to the docking station 2000, through short-range communication, with information indicating that the information is identification information. Furthermore, in response to the reception of a user input of pressing the button provided in the docking station 2000, the docking station 2000 may receive a signal including the identification information from the robot 1000 through short-range communication, and detect the identification information in the received signal. Furthermore, the docking station 2000 may store the detected identification information as the identification information of the robot 1000.

According to another embodiment of the disclosure, the docking station 2000 may include a jumper block and a jumper shunt for setting the identification information to be shared with the robot 1000. As a user slips a jumper shunt over at least one of a plurality of pins in a jumper block corresponding to the selected identification information, the docking station 2000 may detect, from the jumper block, the identification information to be shared with the robot 1000.

Furthermore, according to another embodiment of the disclosure, as the robot 1000 and the docking station 2000 are registered on an IoT server for controlling home appliances, the identification information may be automatically set by the IoT server.

FIG. 5 is a flowchart of a method of docking a robot at a docking station in consideration of ambient signals, according to an embodiment of the disclosure.

In operation S505, the second docking station 2000*b* may output a second docking guidance signal.

The second docking station 2000*b* may periodically output the second docking guidance signal.

The first robot 1000*a* and the second robot 1000*b* may detect the second docking guidance signal output from the second docking station 2000*b*.

According to an embodiment of the disclosure, the second robot 1000*b* may determine whether the detected second docking guidance signal is output from the second docking station 2000*b*, based on second identification information in the second docking guidance signal. The second identification information may be information shared by the second robot 1000*b* and the second docking station 2000*b*.

According to an embodiment of the disclosure, the first robot 1000*a*, which fails to detect first identification information from the detected signal, may determine that the detected signal is not output from the first docking station 2000*a*, and determine the detected signal as an interference signal. The first identification information may be information shared by the first robot 1000*a* and the first docking station 2000*a*.

Furthermore, according to an embodiment of the disclosure, when the first robot 1000*a* stores the second identification information as information corresponding to the second docking station 2000*b*, the firs robot 1000*a* may determine that the detected docking guidance signal is output from the second docking station 2000*b*, and determine the detected signal as an interference signal.

The first robot 1000*a* may be the robot 1000 that is able to be docked at the first docking station 2000*a*, but unable to be docked at the second docking station 2000*b*. Furthermore, the second robot 1000*b* may be the robot 1000 that is able to be docked at the second docking station 2000*b*, but unable to be docked at the first docking station 2000*a*.

In operation S510, the first robot 1000*a* may determine whether docking is necessary.

When the function being performed is determined to be completed, the first robot 1000*a* may determine that docking at the first docking station 2000*a* is necessary. In another example, as the charge amount of a battery falls below a reference charge amount, the first robot 1000*a* may determine that docking at the first docking station 2000*a* is necessary. Furthermore, in another example, when a docking command is received from the server, the first robot 1000*a* may determine that docking at the first docking station 2000*a* is necessary.

In operation S515, the first robot 1000*a* may identify the output time of the second docking guidance signal output from the second docking station 2000*b*.

When the first robot 1000*a* stores the second identification information, the first robot 1000*a* may identify that the received signal is the second docking guidance signal. Furthermore, according to an embodiment of the disclosure, when the first robot 1000*a* does not store the second identification information, the first robot 1000*a* may identify that the received signal is an interference signal.

According to an embodiment of the disclosure, the first robot 1000*a* may measure the received signal, detect the duration of the detected signal, the interval between the detected signals, and the period of the detected signal, based on whether a signal is detected, and identify the output time of the second docking guidance signal.

In operation S520, the first robot 1000*a* may determine the output time of the docking guidance request signal to output, based on the determined output time of the second docking guidance signal.

According to an embodiment of the disclosure, the first robot 1000*a* may determine the output time of the docking guidance request signal to prevent the output time of the docking guidance request signal to be output by the first robot 1000*a* from overlapping the determined output time of the second docking guidance signal.

Furthermore, according to another embodiment of the disclosure, the first robot 1000*a* may determine the output time of the docking guidance request signal to prevent a first docking guidance signal to be output by the first docking station 2000*a* from overlapping the determined output time of the second docking guidance signal and the docking guidance request signal to be output by the first robot 1000*a*.

Furthermore, according to another embodiment of the disclosure, the first robot 1000*a* may determine the output time of the first docking guidance signal to be output by the first docking station 2000*a* to prevent the first docking guidance signal to be output by the first docking station 2000a from overlapping the determined output time of the second docking guidance signal and the docking guidance request signal to be output by the first robot 1000a.

In operation S525, the first robot 1000a may output the docking guidance request signal based on the determined output time of the docking guidance request signal.

According to an embodiment of the disclosure, the docking guidance request signal may include the first identification information. Furthermore, according to an embodiment of the disclosure, the docking guidance request signal may include information about the output time of the first docking guidance signal.

In operation S530, the first docking station 2000a may receive the docking guidance request signal.

The first docking station 2000a may determine that the docking guidance request signal is output by the first robot 1000a based on the first identification information in the docking guidance request signal.

The second docking station 2000b may also receive the docking guidance request signal. However, as the second identification information is not detected from the docking guidance request signal, the second docking station 2000b may determine that the docking guidance request signal is not output from the second robot 1000b, and may ignore the docking guidance request signal.

In operation S535, the first docking station 2000a may output the first docking guidance signal.

When the received docking guidance request signal includes information about the output time of the first docking guidance signal, the first docking station 2000a may output the first docking guidance signal based on the information about the output time of the first docking guidance signal.

Furthermore, the first docking station 2000a may periodically output the first docking guidance signal.

Furthermore, according to an embodiment of the disclosure, when a signal stop command is received from the first robot 1000a, the first docking station 2000a may stop outputting the first docking guidance signal.

Furthermore, according to an embodiment of the disclosure, when the first robot 1000a does not perform docking for a critical time, or the first docking guidance request signal is not received for the critical time, the first docking station 2000a may stop outputting the first docking guidance signal.

In operation S540, the first robot 1000a may receive the first docking guidance signal.

The first robot 1000a may detect a signal, and determine that the detected signal is the first docking guidance signal output from the first docking station 2000a, based on the first identification information.

The second robot 1000b may also receive the first docking guidance signal. However, as the second identification information is not detected from the first docking guidance signal, the second robot 1000b may determine that the received first docking guidance signal is not a signal output from the second docking station 2000b, and ignore the first docking guidance signal.

In operation S545, the first robot 1000a may be docked at the first docking station 2000a.

When the detected signal is determined to be the first docking guidance signal output from the first docking station 2000a, the first robot 1000a may return to the first docking station 2000a and may be docked at the first docking station 2000a, based on the first docking guidance signal that is periodically received.

Figure 6A:
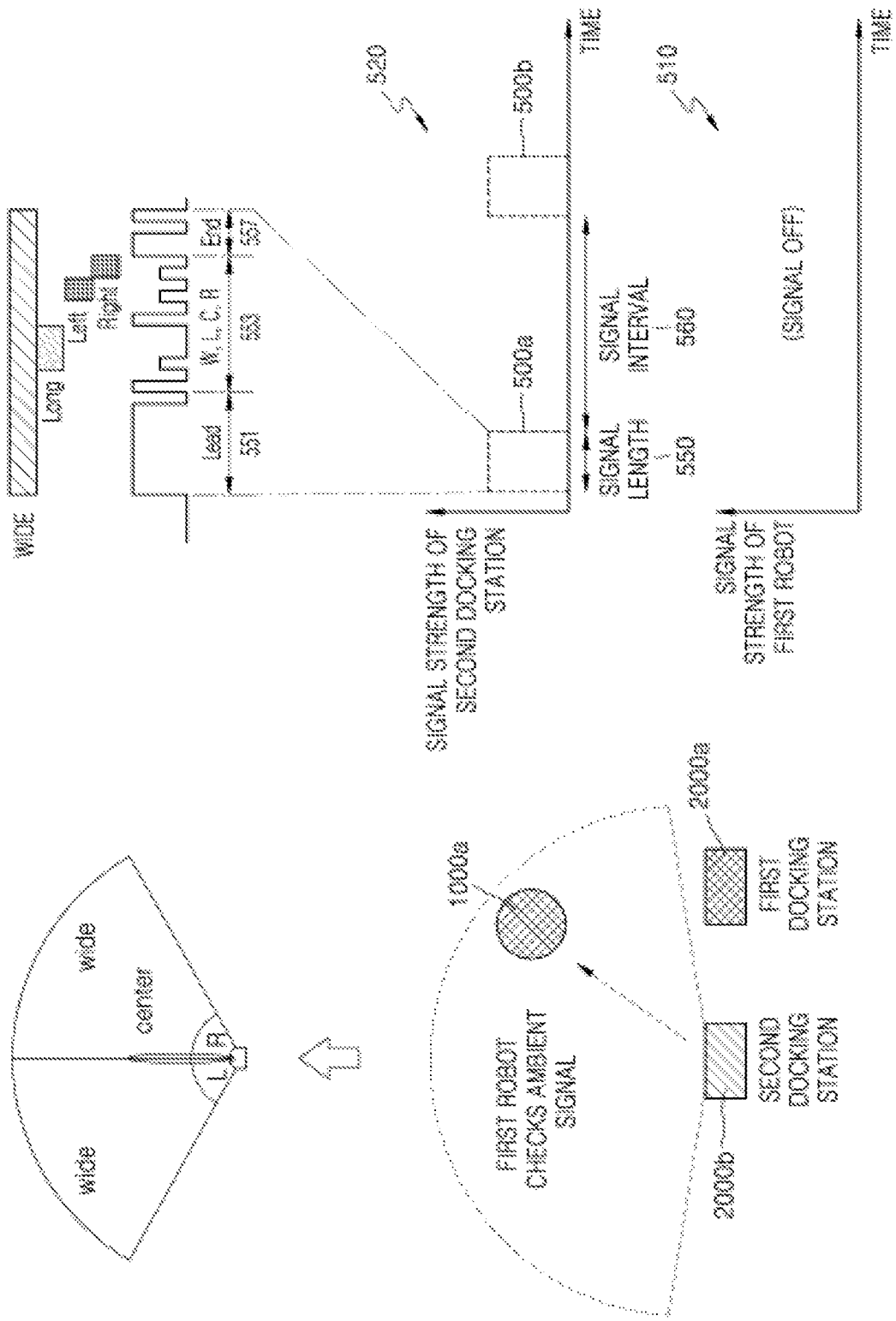
FIGS. 6A, 6B, and 6C illustrate a method of docking the first robot at a first docking station in consideration of ambient signals, according to an embodiment of the disclosure.
Figure 6B:
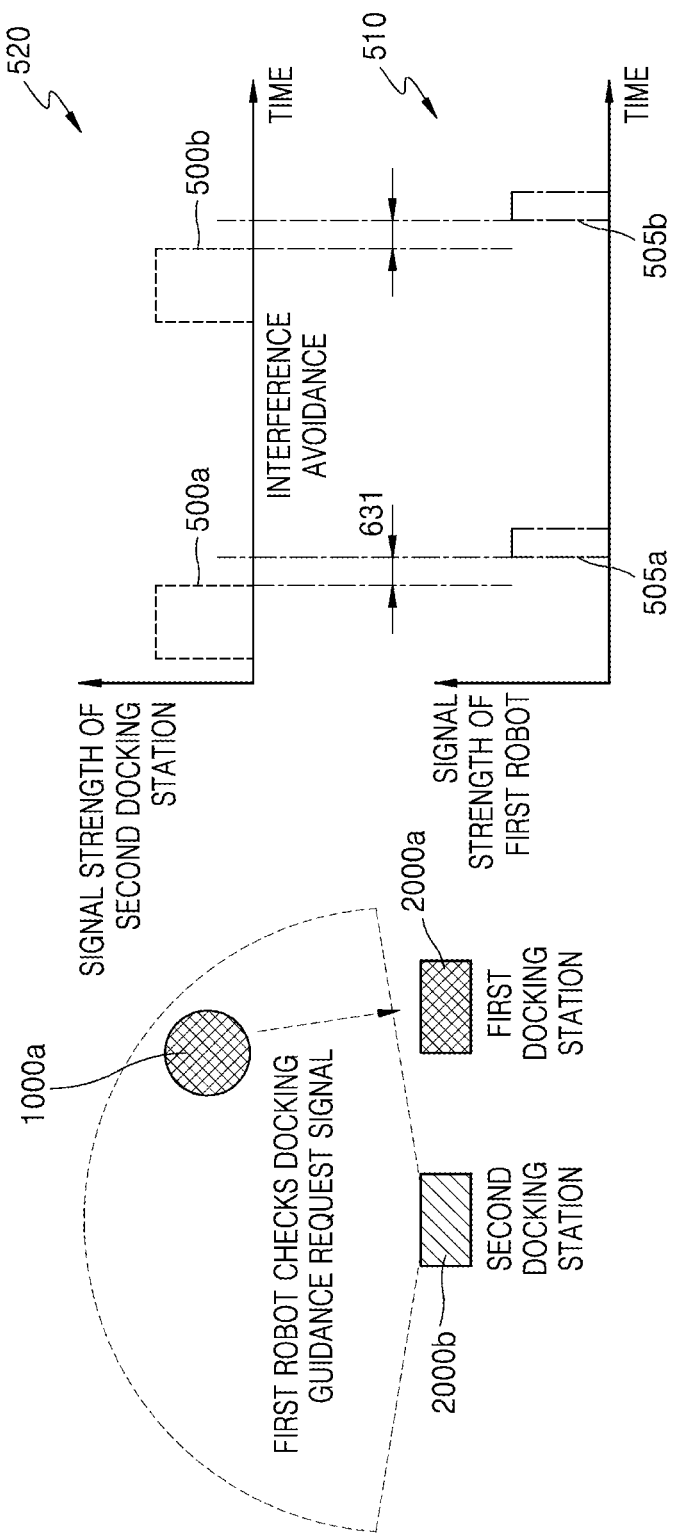
Figure 6C:
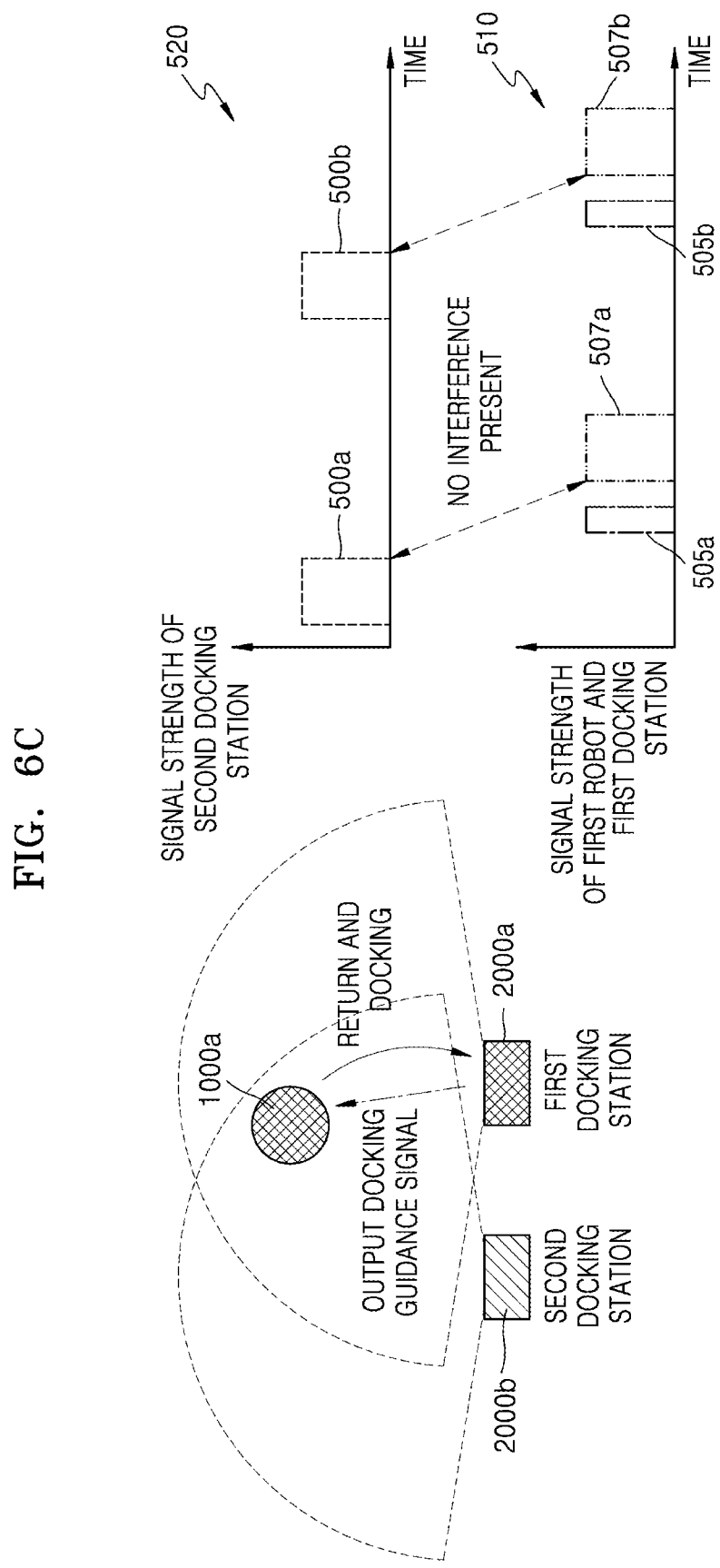

FIGS. 6A to 6C illustrate a method of docking the first robot at a first docking station in consideration of ambient signals, according to an embodiment of the disclosure.

Referring to FIG. 6A, the first robot 1000a may determine whether an ambient signal is detected.

While the second docking station 2000b outputs second docking guidance signals 500a and 500b, the first robot 1000a may determine whether the ambient signal is detected.

A second graph 520 of FIG. 6A is a graph showing a signal output by the second docking station 2000b. Referring to the second graph 520, the second docking station 2000b may periodically output the second docking guidance signals 500a and 500b.

A first graph 510 of FIG. 6A is a graph showing a signal output by the first robot 1000a or the first docking station 2000a. Referring to the first graph 510, the first docking station 2000a and the first robot 1000a may be in a state of outputting no signal.

As illustrated in the second graph 520, the second docking guidance signals 500a and 500b may each be output in a predetermined signal length 550. Furthermore, after a predetermined signal interval 560 from when one docking guidance signal, for example, the second docking guidance signal 500a, ends, the next docking guidance signal, for example, the second docking guidance signal 500b, may be output.

The second docking guidance signal 500a may include at least one section in which no signal is output. Furthermore, the second docking guidance signal 500a may include a plurality of sections corresponding to different pieces of information. For example, the second docking guidance signal 500a may include a first section 551 indicating a leader signal, a second section 553 indicating a data signal, and a third section 337 indicating an end signal.

Furthermore, the second docking guidance signal 500a may include signals output by a plurality of output devices. For example, the second docking guidance signal 500a may be a signal that is generated as a plurality of output devices output a plurality of output signals in a predetermined order, the output devices including three output devices for outputting a signal in a wide range, one output device for outputting a center signal, one output device for outputting a left signal, and one output device for outputting a right signal.

As the second docking guidance signals 500a and 500b are detected, the first robot 1000a may determine the second docking guidance signals 500a and 500b as interference signals.

According to an embodiment of the disclosure, the first robot 1000a may first determine whether the received signals 500a and 500b are the first docking guidance signals output from the first docking station 2000a, based on the first identification information, and when the received signals 500a and 500b are not the first docking guidance signals output from the first docking station 2000a, determine the received signals as interference signals.

The first robot 1000a may determine the signal length and signal interval of interference time.

Referring to FIG. 6B, the first robot 1000a may output docking guidance request signals 505a and 505b based on the output time of the interference signals 500a and 500b.

According to an embodiment of the disclosure, the first robot 1000a may determine the output time of the docking guidance request signals 505a and 505b to prevent the docking guidance request signals 505a and 505b from overlapping the interference signals 500a and 500b. For example, the first robot 1000*a* may determine the output time of the docking guidance request signals 505*a* and 505*b* based on the output time of the interference signals 500*a* and 500*b* and the signal lengths of the docking guidance request signals 505*a* and 505*b*.

The output time of the docking guidance request signals 505*a* and 505*b* may include the start time points and the signal periods of the docking guidance request signals 505*a* and 505*b*. For example, the first robot 1000*a* may determine the start time points of the docking guidance request signals 505*a* and 505*b* to be time points a reference time 631 away from time points when the interference signals 500*a* and 500*b* end. Furthermore, the first robot 1000*a* may determine the signal periods of the docking guidance request signals 505*a* and 505*b* to be the same as the signal periods of the interference signals 500*a* and 500*b*, or to be multiples of the signal periods of the interference signals 500*a* and 500*b*.

Furthermore, according to another embodiment of the disclosure, referring to FIG. 6C, the first robot 1000*a* may determine the output time of the docking guidance request signals 505*a* and 505*b* and first docking guidance signals 507*a* and 507*b* to prevent not only the docking guidance request signals 505*a* and 505*b*, but also the first docking guidance signals 507*a* and 507*b* to be output from the first docking station 2000*a*, from overlapping the interference signals 500*a* and 500*b*. For example, the first robot 1000*a* may determine the output time of the docking guidance request signals 505*a* and 505*b* and the first docking guidance signals 507*a* and 507*b*, based on the signal lengths and the signal interval of the interference signals 500*a* and 500*b*, the signal length of the docking guidance request signals 505*a* and 505*b*, and the signal lengths of the first docking guidance signals 507*a* and 507*b*.

The output time of the first docking guidance signals 507*a* and 507*b* may include the start time points and the signal periods of the first docking guidance signals 507*a* and 507*b*. For example, the first robot 1000*a* may determine the start time points of the first docking guidance signals 507*a* and 507*b* to be time points a certain time away from the time points when the docking guidance request signals 505*a* and 505*b* end. Furthermore, the first robot 1000*a* may determine the signal periods of the first docking guidance signals 507*a* and 507*b* to be the same as the signal periods of the interference signals 500*a* and 500*b*, or to be multiples of the signal periods of the interference signals 500*a* and 500*b*.

As the output time of the docking guidance request signals 505*a* and 505*b* are determined, the first robot 1000*a* may output the docking guidance request signals 505*a* and 505*b* based on the determined output time.

In response to the reception of the docking guidance request signals 505*a* and 505*b*, the first docking station 2000*a* may determine whether the received signals are the docking guidance request signals output from the first robot 1000*a*, based on the first identification information.

As the received signals are determined to be the docking guidance request signals 505*a* and 505*b* output from the first robot 1000*a*, the first docking station 2000*a* may output the first docking guidance signals 507*a* and 507*b*.

According to an embodiment of the disclosure, the first docking station 2000*a* may output the first docking guidance signals 507*a* and 507*b* based on the predetermined output time of the first docking guidance signals 507*a* and 507*b*. For example, the predetermined output time of the first docking guidance signals 507*a* and 507*b* may be time points predetermined time away from time points when the docking guidance request signals 505*a* and 505*b* end.

According to another embodiment of the disclosure, the first docking station 2000*a* may detect information about the output time of the first docking guidance signals 507*a* and 507*b* from the docking guidance request signals 505*a* and 505*b*, and output the first docking guidance signals 507*a* and 507*b* based on the detected information about the output time of the first docking guidance signals 507*a* and 507*b*.

As the first docking station 2000*a* outputs the first docking guidance signals 507*a* and 507*b*, the first robot 1000*a* may receive the first docking guidance signals 507*a* and 507*b* output from the first docking station 2000*a*. In response to the reception of the first docking guidance signals 507*a* and 507*b*, the first robot 1000*a* may return to the first docking station 2000*a* based on the first docking guidance signals 507*a* and 507*b*, and then may be docked at the first docking station 2000*a*.

Accordingly, even when the first robot 1000*a* and the second robot 1000*b* are operated together, the first robot 1000*a* and the second robot 1000*b* may be docked at the docking station 2000 without interference with each other.

Figure 7:
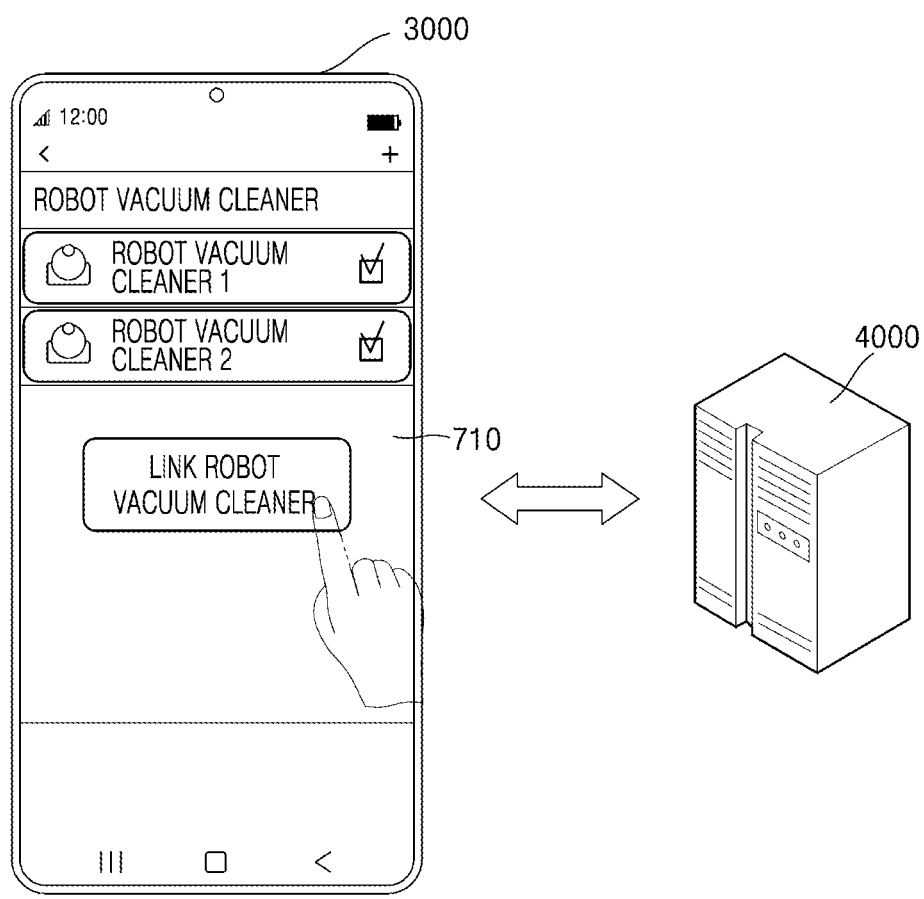
FIG. 7 illustrates a method of exchanging, by a plurality of robots, identification information with each other, according to an embodiment of the disclosure.

FIG. 7 illustrates a method of exchanging, by a plurality of robots, identification information with each other, according to an embodiment of the disclosure.

Referring to FIG. 7, the device 3000 may provide a menu 710 that enables a plurality of robots 1000 to exchange identification information with each other. The identification information may be identification information that is shared by each of the robots 1000 with the docking station 2000 corresponding thereto.

The device 3000 may select a plurality of the robots 1000 used in the same space through the menu 710, and may receive a user input of pressing a robot link button. In response to the reception of the user input of pressing the robot link button, the device 3000 transmit identification information of each of the robots 1000 to other robots 1000 through a server 4000. For example, the device 3000 may transmit, through the server 4000, the identification information of the first robot 1000*a* to the second robot 1000*b*, and the identification information of the second robot 1000*b* to the first robot 1000*a*. The server 4000 may include an IoT server and store identification information and address information of the device 3000, the first robot 1000*a*, and the second robot 1000*b*, corresponding to a user account.

Accordingly, the first robot 1000*a* may recognize the identification information shared by the second robot 1000*b* with the second docking station 2000*b*, and the second robot 1000*b* may recognize the identification information shared by the first robot 1000*a* with the first docking station 2000*a*.

Figure 8:
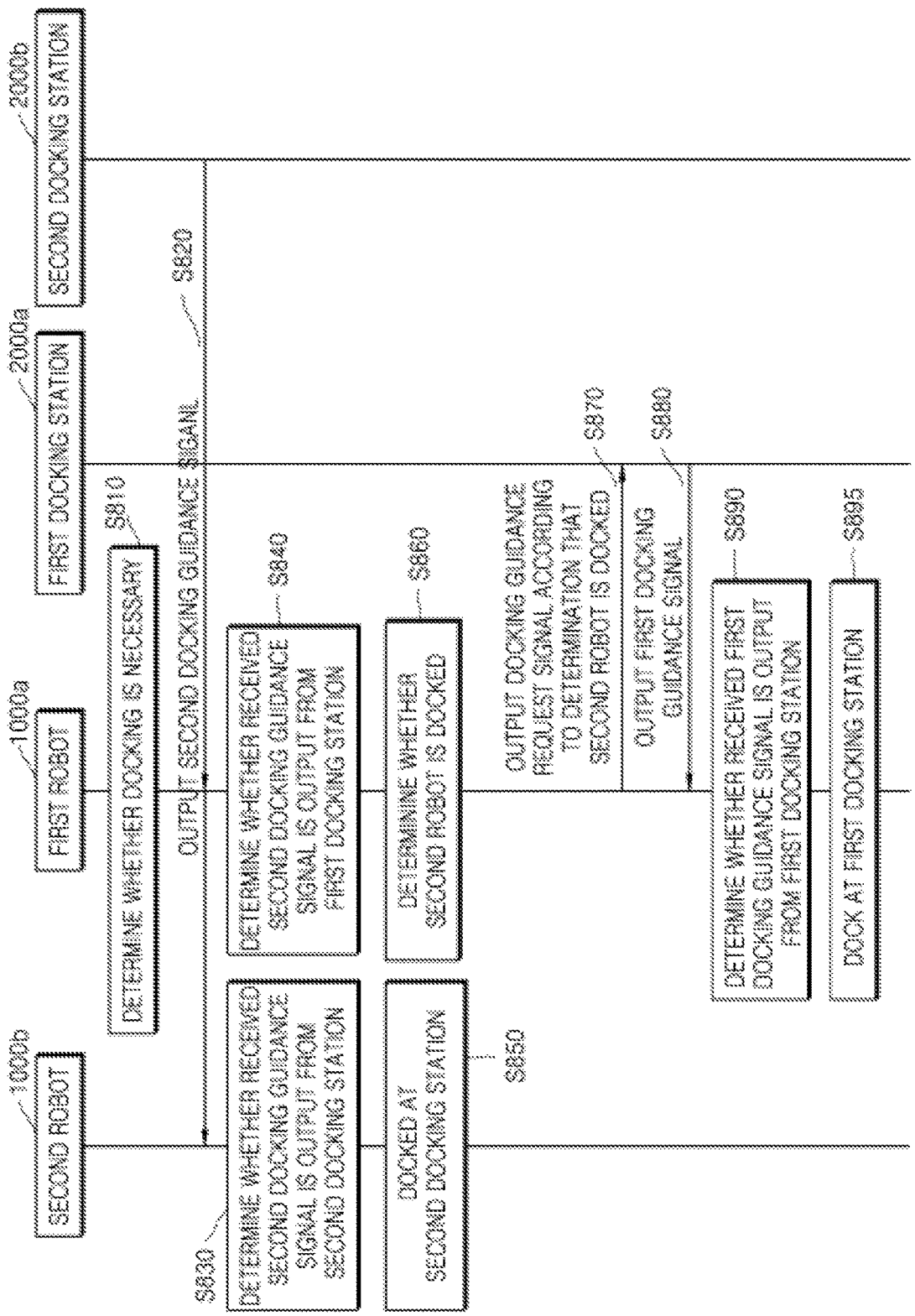
FIG. 8 is a flowchart of a method of docking a robot at a docking station, according to another embodiment of the disclosure.

FIG. 8 is a flowchart of a method of docking a robot at a docking station, according to another embodiment of the disclosure.

In operation S810, the first robot 1000*a* may determine whether docking is necessary.

As docking is determined to be necessary, the first robot 1000*a* may determine whether an interference signal is present.

In operation S820, the second docking station 2000*b* may output the second docking guidance signal.

When the first robot 1000*a* determines whether an interference signal is present, the second docking station 2000*b* may be in a state of outputting the second docking guidance signal. The second docking guidance signal may include the second identification information shared by the second robot 1000*b* and the second docking station 2000*b*.

In operation S830, the second robot 1000*b* may determine whether the received second docking guidance signal is output from the second docking station 2000*b*.

When information indicating being a docking guidance signal and the second identification information in the received second docking guidance signal are detected, the second robot 1000b may recognize that the received second docking guidance signal is a docking guidance signal, and determine that the second docking guidance signal is output from the second docking station 2000b.

In operation S840, the first robot 1000a may determine that the received second docking guidance signal is output from the first docking station 2000a.

The first robot 1000a may detect the information indicating being a docking guidance signal in the received second docking guidance signal. Furthermore, the first robot 1000a may not detect first identification information from the received second docking guidance signal. The first identification information may be identification information shared by the first robot 1000a and the first docking station 2000a.

When the first identification information from the received second docking guidance signal is not received, the first robot 1000a may be determined that the received second docking guidance signal is not output from the first docking station 2000a. Furthermore, the first robot 1000a may determine the received second docking guidance signal as an interference signal.

According to an embodiment of the disclosure, the first robot 1000a may detect the second identification information in the received second docking guidance signal, and determine that the received second docking guidance signal is a docking guidance signal output from the second docking station 2000b corresponding to the second robot 1000b.

In operation S850, the second robot 1000b may be docked at the second docking station 2000b.

The second robot 1000b may return to the second docking station 2000b and may be docked at the second docking station 2000b, based on the second docking guidance signal that is periodically output.

In operation S860, the first robot 1000a may determine whether the second robot 1000b is docked.

The first robot 1000a may determine whether outputting the second docking guidance signal determined as an interference signal is stopped. For example, the first robot 1000a may determine the period of the received second docking guidance signal, and when the second docking guidance signal is not received for two periods, determine that outputting the second docking guidance signal is stopped.

When the first robot 1000a may determine that the second docking guidance signal is a docking guidance signal output from the second docking station 2000b corresponding to the second robot 1000b, the first robot 1000a may determine that outputting the second docking guidance signal is stopped, thereby determining that the second robot 1000b is docked at the second docking station 2000b.

In operation S870, when the second robot 1000b is determined to be docked, the first robot 1000a may output the docking guidance request signal.

When the second robot 1000b is determined to be completely docked at the second docking station 2000b, the first robot 1000a may output the docking guidance request signal. Furthermore, the docking guidance request signal may include the first identification information shared by the first robot 1000a and the first docking station 2000a.

In operation S880, the first docking station 2000a may output the first docking guidance signal.

The first docking station 2000a may periodically output the first docking guidance signal. Furthermore, the first docking guidance signal may include the first identification information.

In operation S890, the first robot 1000a may determine whether the received first docking guidance signal is output from the first docking station 2000a.

When the first identification information is detected from the received first docking guidance signal, the first robot 1000a may determine that the received first docking guidance signal is output from the first docking station 2000a.

In operation S895, the first robot 1000a may be docked at the first docking station 2000a.

The first robot 1000a may return to the first docking station 2000a and may be docked at the first docking station 2000a, based on the first docking guidance signal that is periodically output.

Figure 9:
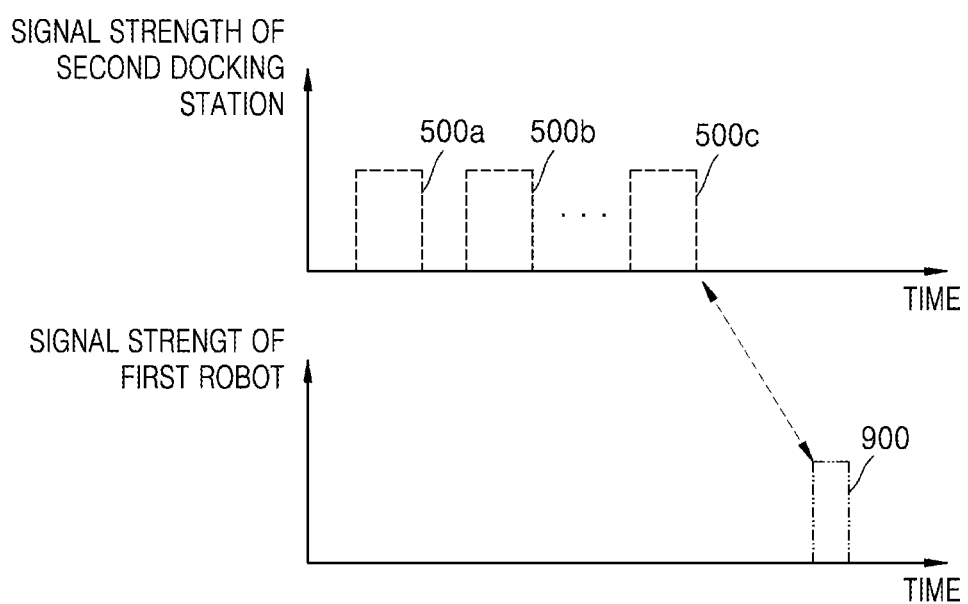
FIG. 9 illustrates signals output by a robot and a docking station, according to another embodiment of the disclosure.

FIG. 9 illustrates signals output by a robot and a docking station, according to another embodiment of the disclosure.

Referring to FIG. 9, when the second docking station 2000b outputs the second docking guidance signals 500a to 500c for docking of the second robot 1000b, the first robot 1000a may output a docking guidance request signal 900 as it is determined that the docking of the second robot 1000b is completed so that the second docking guidance signals 500a to 500c are no longer output.

Figure 10:
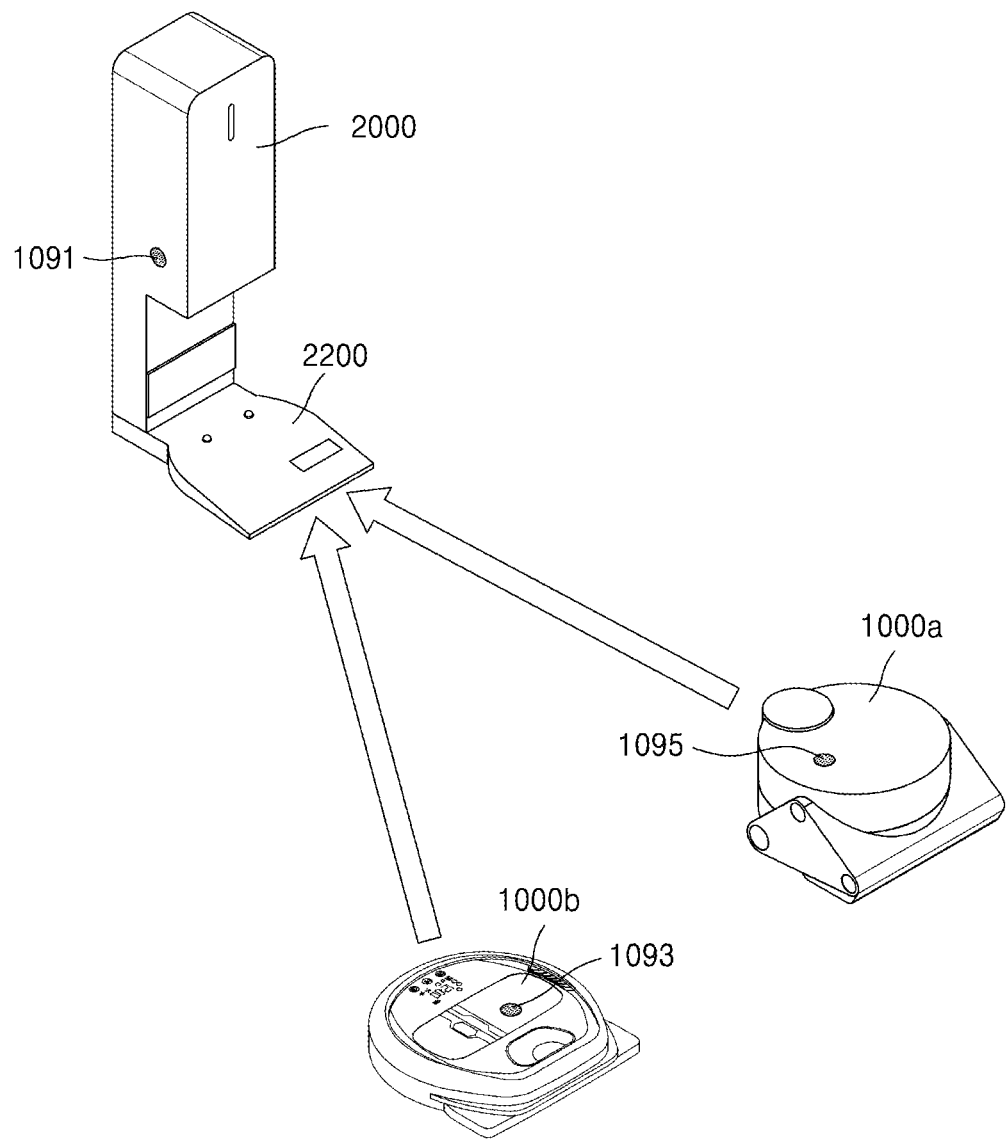
FIG. 10 illustrates a method of sharing identification information between one docking station and a plurality of robots, according to an embodiment of the disclosure.

FIG. 10 illustrates a method of sharing identification information between one docking station and a plurality of robots, according to an embodiment of the disclosure.

Referring to FIG. 10, two robots (1000a and 1000b) may be sequentially docked, one by one, at the docking station 2000 having one docking part 2200.

Each of the first and second robots 1000a and 000b may share identification information with the docking station 2000.

According to an embodiment of the disclosure, the docking station 2000 and each of the first and second robots 1000a and 1000b may share identification information in a docked state. For example, as the first robot 1000a is docked at the docking station 2000, the docking station 2000 may transmit first identification information to the first robot 1000a, and the first robot 1000a may store the received first identification information as identification information to be shared with the docking station 2000. Furthermore, as the second robot 1000b is docked at the docking station 2000, the docking station 2000 may transmit second identification information to the second robot 1000b, and the second robot 1000b may store the received second identification information as identification information to be shared with the docking station 2000.

According to another embodiment of the disclosure, the docking station 2000 and each of the first and second robots 1000a and 1000b may each include a registration button. For example, In response to the reception of a user input of pressing registration buttons 1091 and 1095 respectively provided in the docking station 2000 and the first robot 1000a, the docking station 2000 may transmit the first identification information to the first robot 1000a, and the first robot 1000a may store the received first identification information as identification information to be shared with the docking station 2000. Furthermore, In response to the reception of a user input of pressing registration buttons 1091 and 1093 respectively provided in the docking station 2000 and the second robot 1000b, the docking station 2000 may transmit the second identification information to the second robot 1000b, and the second robot 1000b may store the received second identification information as identification information to be shared with the docking station 2000.

The docking station 2000 may store a plurality of pieces of predetermined identification information, and select one of the pieces of identification information and transmit the selected identification information to each of the first and second robots 1000a and 1000b as identification information to be shared.

Figure 11:
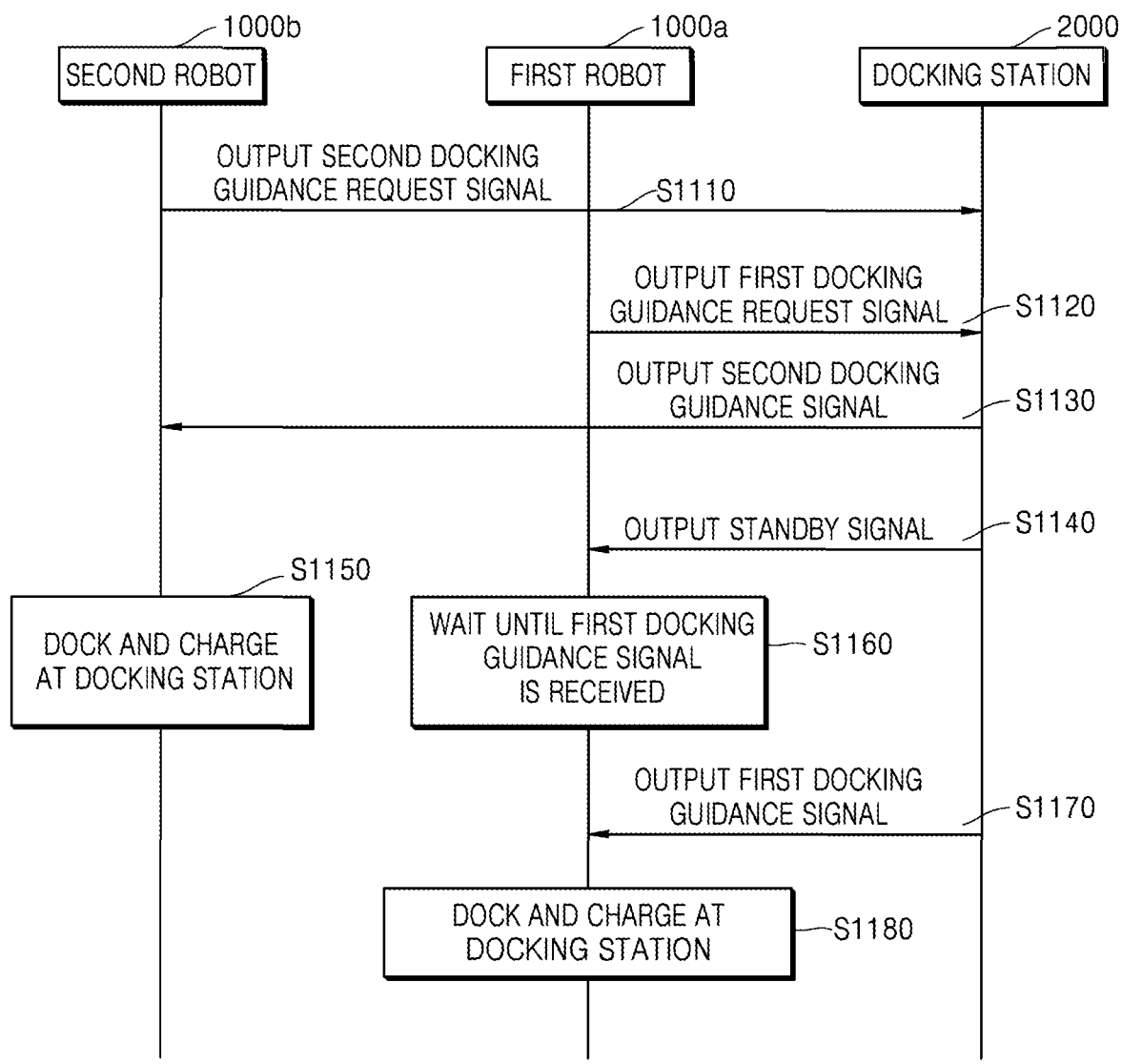
FIG. 11 is a flowchart of a method of docking a plurality of robots at one docking station, according to an embodiment of the disclosure.

FIG. 11 is a flowchart of a method of docking a plurality of robots at one docking station, according to an embodiment of the disclosure.

In operation S1110, the second robot 1000b may output a second docking guidance request signal.

In response to the reception of the second docking guidance request signal, the docking station 2000 may detect second identification information in the second docking guidance request signal. The docking station 2000 may determine that the received second docking guidance request signal is output from the second robot 1000b, based on the detected second identification information.

In operation S1120, the first robot 1000a may output a first docking guidance request signal.

The first robot 1000a may output the first docking guidance request signal at a time point that does not overlap the output time of the second docking guidance request signal.

In response to the reception of the first docking guidance request signal, the docking station 2000 may detect the first identification information in the first docking guidance request signal. The docking station 2000 may determine that the received first docking guidance request signal is output from the first robot 1000a, based on the detected first identification information.

In operation S1130, the docking station 2000 may output a second docking guidance signal.

The docking station 2000 may determine a reception order of the second docking guidance request signal and the first docking guidance request signal, determine that the second docking guidance request signal is received earlier than the first docking guidance request signal, and output the second docking guidance signal.

In operation S1140, the docking station 2000 may output a standby signal.

The docking station 2000 may determine, based on a receiving order of the docking guidance request signals, that docking the first robot 1000a starts after the docking of the second robot 1000b is completed, and output a standby signal including the first identification information.

The docking station 2000 may output a standby signal based on the period of the second docking guidance signal, to prevent the standby signal from overlapping the second docking guidance signal.

According to an embodiment of the disclosure, the docking station 2000 may output the standby signal once or multiple times. Furthermore, according to an embodiment of the disclosure, the docking station 2000 may periodically output the standby signal including the first identification information until the docking of the second robot 1000b is completed. Furthermore, according to an embodiment of the disclosure, the docking station 2000 may output the standby signal until a signal indicating that the standby signal is received from the first robot 1000a is received.

In operation S1150, the second robot 1000b may be docked and then charged at the docking station 2000.

The second robot 1000b, which detects the second identification information in the second docking guidance signal, may be docked at the docking station 2000 based on the second docking guidance signal that is periodically output.

The first robot 1000a may also receive the second docking guidance signal. However, as the first identification information is not detected in the second docking guidance signal, the first robot 1000a may determine that the second docking guidance signal is not a signal for itself and ignore the second docking guidance signal.

In operation S1160, the first robot 1000a may wait until the first docking guidance signal is received.

When a standby signal indicating to wait is received, and the first identification information in the standby signal is determined, the first robot 1000a may no longer output the first docking guidance request signal and wait until the first docking guidance signal is received.

Furthermore, according to an embodiment of the disclosure, when the first robot 1000a stores the second identification information shared by the second robot 1000b and the docking station 2000, the first robot 1000a, which detects the second identification information in the second docking guidance signal, may determine that the second docking guidance signal for the second robot 1000b is output. In this case, the first robot 1000a may wait until the first docking guidance signal is received, even when the standby signal is not output.

The second robot 1000b may also receive the standby signal. However, as the second identification information is not detected from the standby signal, the second robot 1000b may determine that the received standby signal is not a signal for itself and ignore the received standby signal.

In operation S1170, the docking station 2000 may output the first docking guidance signal.

When the second robot 1000b is docked at the docking station 2000 and completes charging, the second robot 1000b may be undocked from the docking station 2000. Upon undocking, the second robot 1000b may be separated a certain distance or more from the docking station 2000, and may move to a predetermine location to maintain a standby state.

As the second robot 1000b is undocked from the docking station 2000, the docking station 2000 may output the first docking guidance signal for the docking of the first robot 1000a.

In operation S1180, the first robot 1000a may be docked at the docking station 2000 and then charged.

The first robot 1000a may be charged after docked at the docking station 2000, based on the first docking guidance signal.

Figure 12A:
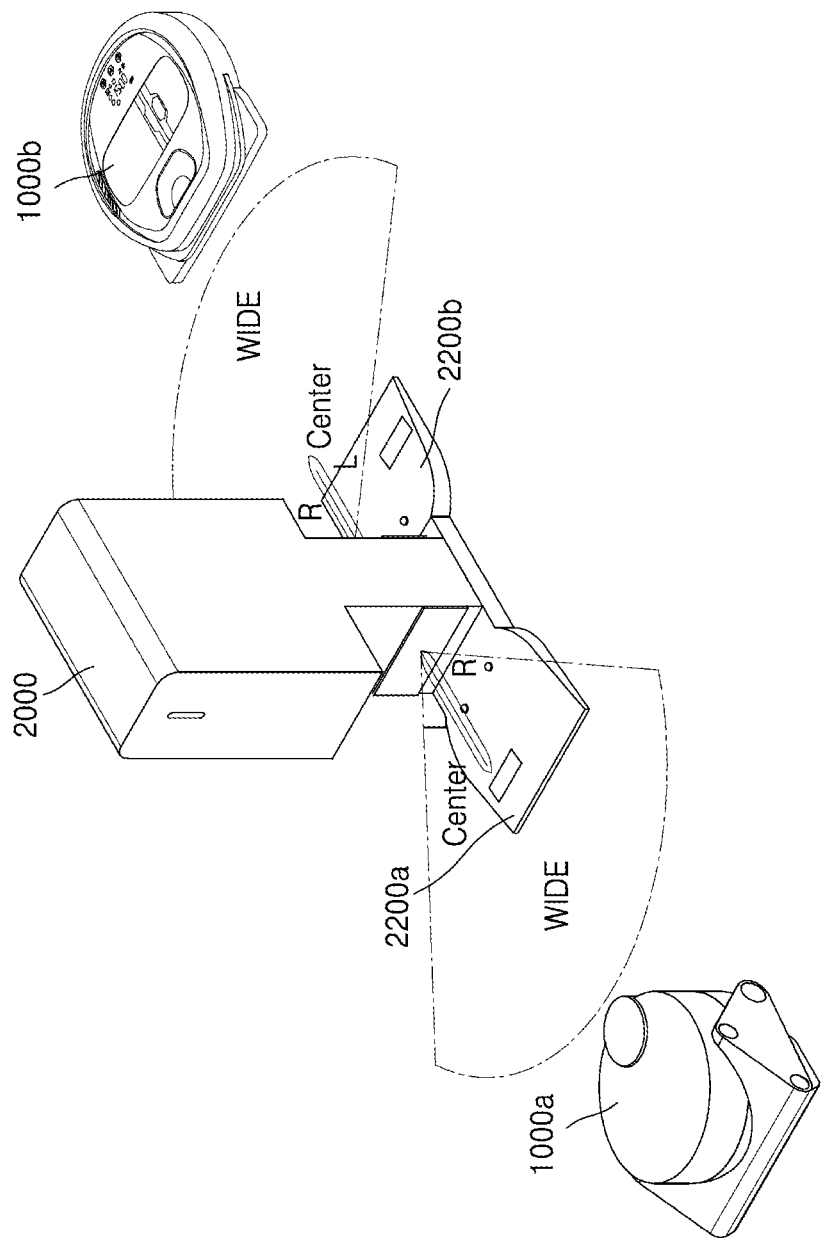
FIGS. 12A and 12B illustrates a method of docking a plurality of robots at one docking station when the docking station includes a plurality of docking parts, according to an embodiment of the disclosure.
Figure 12B:
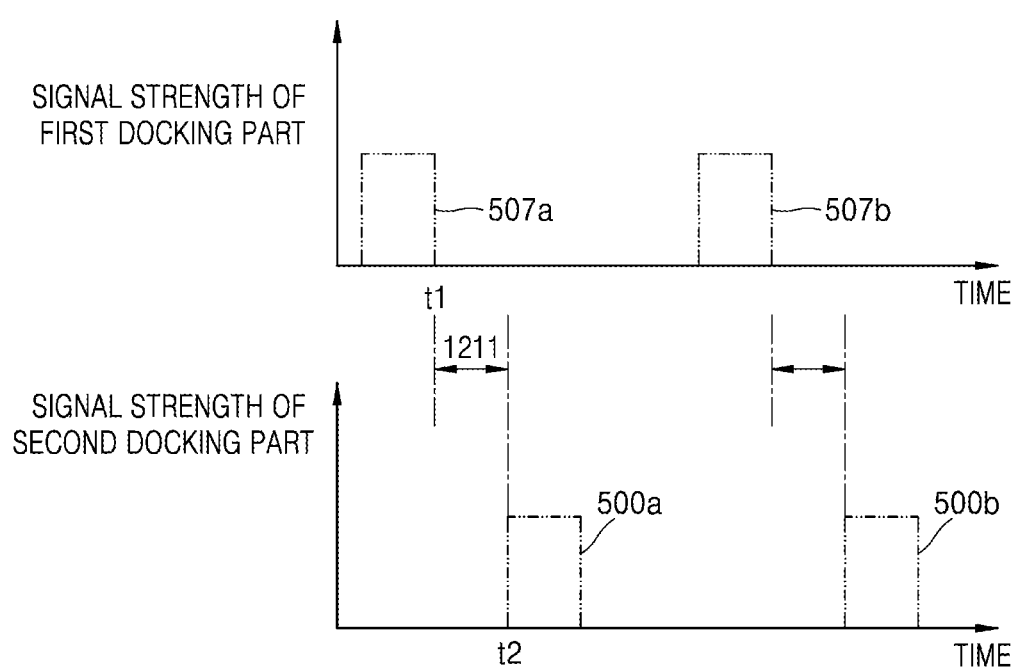

FIGS. 12A and 12B illustrates a method of docking a plurality of robots at one docking station when the docking station includes a plurality of docking parts, according to an embodiment of the disclosure.

Referring to FIG. 12A, the docking station 2000 may include a plurality of docking parts, for example, a first docking part 2200a and a second docking part 2200b. Furthermore, each of the docking parts may include a communication module for transmitting/receiving a short-range communication signal with the robot 1000 and a charging terminal for charging a robot.

The first docking part 2200a and the second docking part 2200b may be docking parts having different structures for docking different types of robots. In this case, the first robot 1000a may be docked at the first docking part 2200a only, and the second robot 1000b may be docked at the second docking part 2200b only.

The first robot 1000a may share first identification information with the docking station 2000. The second robot 1000b may share second identification information with the docking station 2000. Furthermore, the docking station 2000 may store identification information of a docking part corresponding to each robot 1000. For example, the docking station 2000 may store identification information of the first docking part 2200a as a docking part corresponding to the first robot 1000a and identification information of the second docking part 2200b as a docking part corresponding to the second robot 1000b.

The docking station 2000 may output a first docking guidance signal corresponding to the first robot 1000a, through the first docking part 2200a. Furthermore, the docking station 2000 may output a second docking guidance signal corresponding to the second robot 1000b, through the second docking part 2200b.

In response to the reception of a first docking guidance request signal including first identification information from the first robot 1000a through the first docking part 2200a, the docking station 2000 may output a first docking guidance signal including the first identification information. Furthermore, in response to the reception of a second docking guidance request signal including second identification information from the second robot 1000b through the second docking part 2200b, the docking station 2000 may output a second docking guidance signal including the second identification information.

Furthermore, according to an embodiment of the disclosure, as the docking station 2000 does not receive a docking guidance request signal and the first or second robot 1000a or 1000b is undocked, the docking station 2000 may periodically output a docking guidance signal corresponding to the first or second robot 1000a or 1000b that is undocked.

Referring to FIG. 12B, as the first robot 1000a and the second robot 1000b are undocked, when the first robot 1000a and the second robot 1000b are docked together, the docking station 2000 may output one docking guidance signal and then another docking guidance signal when a reference time passes after the one docking guidance signal is output, not to overlap the output time of first docking guidance signals 507a and 507b and the output time of second docking guidance signals 500a and 500b. For example, the docking station 2000 may output the first docking guidance signal 507a and then the second docking guidance signal 500a when a reference time 1211 passes after the first docking guidance signal 507a is output.

According to an embodiment of the disclosure, when the signal output coverage of the first docking part 2200a does not overlap the signal output coverage of the second docking part 2200b, the docking station 2000 may simultaneously output the first docking guidance signals 507a and 507b and the second docking guidance signals 500a and 500b.

In another embodiment of the disclosure, the first docking part 2200a and the second docking part 2200b may he docking parts having the same structure. In this case, each of the first and second robots 1000a and 1000b may be docked at any one of the first docking part 2200a and the second docking part 2200b.

In this case, in response to the reception of the first docking guidance request signal output by the first robot 1000a, the docking station 2000 may output a first docking guidance signal through one of the first docking part 2200a and the second docking part 2200b. For example, in response to the reception of the first docking guidance request signal, the docking station 2000 may identify a docking part that does not output a docking guidance signal while not being docked by the first or second robot 1000a or 1000b, and output the first docking guidance signal through the identified docking part.

Figure 13:
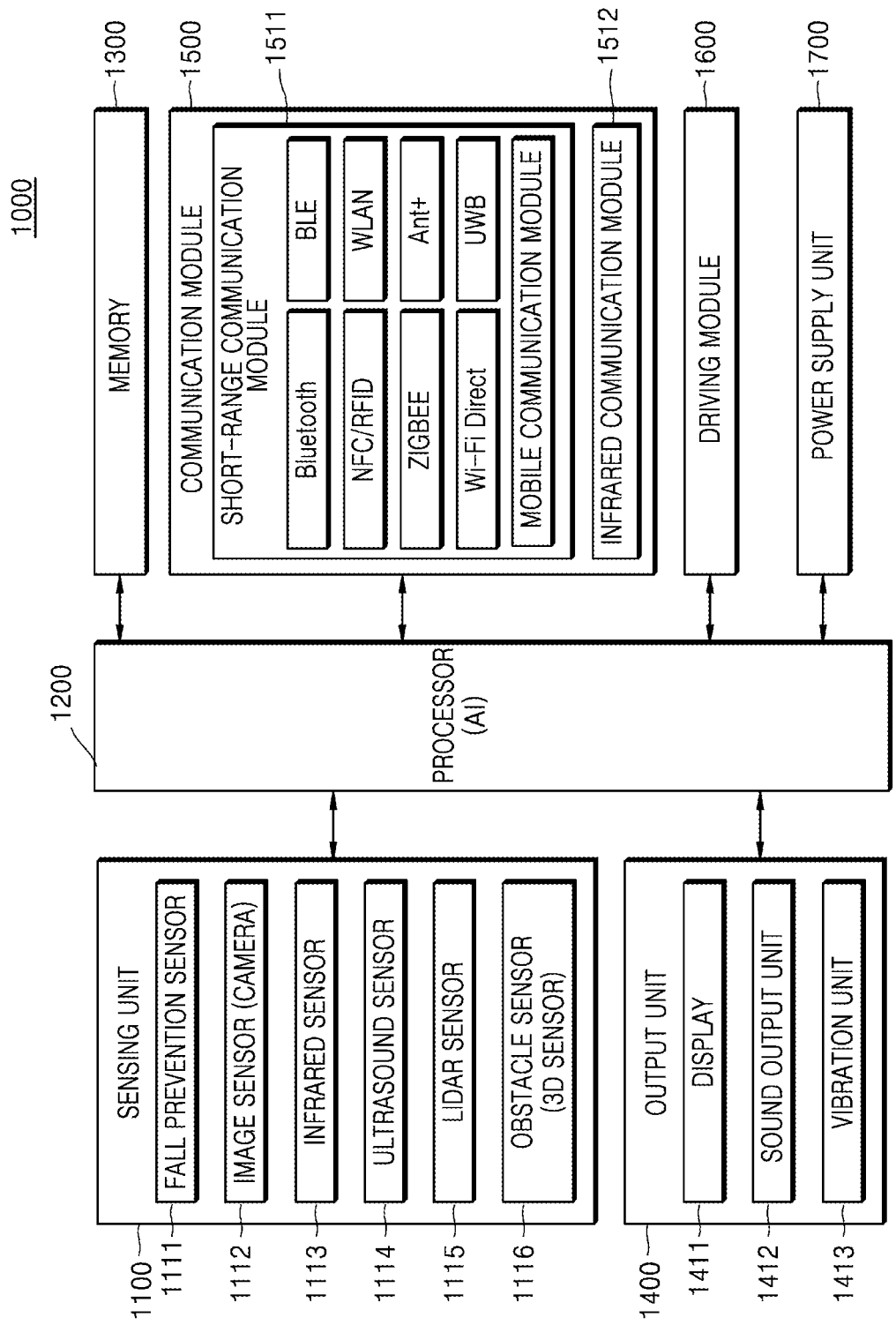
FIG. 13 is a block diagram to explain the function of a robot, according to an embodiment of the disclosure.

FIG. 13 is a block diagram to explain the function of a robot, according to an embodiment of the disclosure.

Referring to FIG. 13, the robot 1000 may include a sensing unit 1100, the processor 1200, a memory 1300, an output unit 1400, the communication module 1500, the driving module 1600, and a power supply unit 1700. However, all constituent elements illustrated in FIG. 13 are not essential constituent elements of the robot 1000. The robot 1000 may be implemented by constituent elements more or less than the constituent elements illustrated in FIG. 13. The configurations of the constituent elements are described in order.

The sensing unit 1100 may include a plurality of sensors configured to sense information about an environment around the robot 1000. For example, the sensing unit 1100 may include a fall prevention sensor 1111, an image sensor (camera) 1112, for example, a stereo camera, a monocamera, a wide angle camera, an around view camera or three-dimensional (3D) vision sensor, and the like, an infrared sensor 1113, an ultrasound sensor 1114, a LiDAR sensor 1115, an obstacle sensor (3D sensor) 1116, a traveling distance detection sensor (not shown), and the like, but the disclosure is not limited thereto. The traveling distance detection sensor may include a rotation detection sensor for calculating the number of rotations of a wheel. For example, the rotation detection sensor may include an encoder installed to detect the number of rotations of a motor. The image sensor (camera) 1112 may include a plurality of image sensors or cameras arranged in the robot 1000 according to embodiments of the disclosure. As the function of each sensor may be intuitively inferred by a person skilled in the art from the name thereof, a detailed description is omitted.

According to an embodiment of the disclosure, the sensing unit 1100 may be used to generate an indoor space map 500. For example, the robot 1000 may generate the indoor space map 500 by using at least one of the camera 1112, the ultrasound sensor 1114, the LiDAR sensor 1115, or the obstacle sensor (3D sensor) 1116.

The processor 1200 may typically control the overall operation of the robot 1000. The processor 1200 may control the sensing unit 1100, the output unit 1400, the communication module 1500, the driving module 1600, and the power supply unit 1700, by executing programs stored in the memory 1300.

According to an embodiment of the disclosure, the processor 1200 may include an artificial intelligence (AI) processor. An AI processor may be manufactured in the form of a dedicated hardware chip for AI, or as a part of an existing general purpose processor, for example, a CPU or an application processor, or a graphics dedicated processor, for example, a GPU, and mounted on the robot 1000.

The processor 1200 may be responsible for cleaning traveling such as determining the direction of the robot 1000 and the like, location recognition, and automatic charging of a battery, and the like. For example, the processor 1200 may control the robot 1000 to wait in a state of being docked at the docking station 2000 during non-operation of the battery, so that the charge amount of the battery may be maintained within a certain range. When charging request and signal are input from a battery charge amount detection portion (not shown) when an operation is completed or during an operation, the processor 1200 may control the driving module 1600 to return the robot 1000 to the docking station 2000.

The memory 1300 may store programs for processing and control by the processor 1200, and store identification information shared with the docking station 2000 and data that are input/output, for example, indoor space map, a cleaning path, and the like. The memory 1300 may store an AI model.

The memory 1300 may include a storage medium of at least one type of memory such as a flash memory type, a hard disk type, a multimedia card micro type, a card type, for example, SD or XD memory, and the like, random access memory (RAM), static random access memory (SRAM), read-only memory (ROM), electrically erasable programmable ROM (EEPROM), programmable read-only memory (PROM), magnetic memory, a magnetic disk, an optical disc, and the like. Furthermore, the robot 1000 may operate a web storage or a cloud server that performs a storage function on the Internet.

The output unit 1400, which is to output an audio signal, a video signal, or a vibration signal, may include a display 1411, a sound output unit 1412, a vibration unit 1413, and the like.

The display 1411 may output and display information processed by the robot 1000. For example, the display 1411 may display the current location of the robot 1000, a cleaning mode of the robot 1000, a cleaning state, for example, a progress rate, a charging state, for example, a remaining battery amount, and the like, but the disclosure is not limited thereto. The display 1411 may display a user interface (UI) or a graphical user interface (GUI) related to a mode setting.

When the display 1411 and a touchpad form a layer structure to be configured as a touch screen, the display 1411 may be used as both an input device and an output device. The display 1411 may include at least one of a liquid crystal display, a thin film transistor-liquid crystal display, an organic light-emitting diode, a flexible display, a 3D display, or an electrophoretic display. According to an implement form of the robot 1000, the robot 1000 may include two or more displays as the display 1411.

The sound output unit 1412 may output audio data received from the communication module 1500 or stored in the memory 1300. Furthermore, the sound output unit 1412 may output a sound signal related to a function performed in the robot 1000. For example, the sound output unit 1412 may output a voice message indicating completion of cleaning. The sound output unit 1412 may include a speaker, a buzzer, and the like.

The vibration unit 1413 may output a vibration signal. For example, the vibration unit 1413 may output a vibration signal corresponding to the output of audio data or video data, for example, a warning message and the like.

The communication module 1500 may include an at least one antenna to wirelessly communicate with other device, for example, the docking station 2000, a server device (not shown), a display device (not shown), a plurality of home appliances (not shown), and the like. For example, the communication module 1500 may include a short-range communication module (short-range wireless communication unit) 1511, a mobile communication module 1512, and the like, but the disclosure is not limited thereto.

The short-range communication module (short-range wireless communication unit) 1511 may include a Bluetooth communication module, a BLE communication module, a short-range wireless communication module (near field communication unit), a WLAN (WiFi) communication module, a Zigbee communication module, an IrDA communication module, a WFD communication module, a UWB communication module, an Ant+ communication module, a micro-wave (pWave) communication module, and the like, but the disclosure is not limited thereto.

The mobile communication module 1512 may transmit/receive a wireless signal with at least one of a base station, an external terminal, or a server, on a mobile communication network. The wireless signal may include various types of data according to transmission/reception of a voice call signal, a video call signal, or a text/multimedia message.

The driving module 1600 may include configurations used for driving (running) of the robot 1000 and the operation of devices in the robot 1000. The driving module 1600 may include an absorbing portion, a traveling portion, and the like, but the disclosure is not limited thereto. The absorbing portion has a function of collecting dust on the floor while inhaling air, and may include a rotating brush or broom, a rotating brush motor, an air intake port, a filter, a dust collection chamber, an air discharge port, and the like, but the disclosure is not limited thereto. The absorbing portion may be mounted in a structure in which an additional brush capable of sweeping away corner dust is rotated.

The traveling portion may include two wheels provided at opposite sides in the front, two wheels provided at opposite sides at the back, a motor for driving the two rear wheels to rotate, and a timing belt provided to transfer power generated from the rear wheels to the front wheels, and the like, but the disclosure is not limited thereto.

According to an embodiment of the disclosure, the robot 1000 may include an input portion (not shown). The input portion may mean a device used by a user to input data for controlling the robot 1000. For example, the input unit may include a key pad, a dome switch, a touch pad (a contact capacitive method, a pressure resistance film method, an infrared sensing method, a surface ultrasound conduction method, an integral tension measurement method, a piezo effect method, and the like), a jog wheel, a jog switch, and the like, but the disclosure is not limited thereto.

The processor 1200 may determine the output time of a second docking guidance signal that is output from a second docking station, determine the output time of a docking guidance request signal to prevent the docking guidance request signal to be output by a robot from overlapping the second docking guidance signal that is output, output the docking guidance request signal through the communication module 1500, based on the determined output time of the docking guidance request signal, and as a first docking station receiving the docking guidance request signal outputs a first docking guidance signal, drive the driving module 1600 to dock another robot at a first docking station, based on the first docking guidance signal that is output.

The processor 1200 may determine part of a section in which the second docking guidance signal is not output, as the output time of the docking guidance request signal, based on the period of the second docking guidance signal.

The processor 1200 may determine the output time of the docking guidance request signal to prevent the second docking guidance signal that is output from overlapping a docking guidance request signal to be output and a first docking guidance signal to be output.

The processor 1200, in response to the reception of a first docking guidance signal including identification information, may identify that the first docking guidance signal is output by the first docking station, based on the identification information.

The processor 1200 may determine whether the second robot 1000$b$ is docked at the second docking station 2000$b$, based on whether the second docking guidance signal is output, and as the second robot 1000$b$ is determined to be docked at the second docking station 2000$b$, may output the docking guidance request signal through the communication module 1500.

The computer-readable storage media may be provided in the form of a non-transitory storage medium. Here, the non-transitory storage medium merely means that the storage medium is tangible and does not contain signals, for example, electromagnetic waves, but this term does not distinguish a case in which data is semi-permanently stored in the storage medium from a case in which data is temporarily stored in the storage medium. In an example, a non-transitory storage medium may include a buffer in which data is temporarily stored.

According to an embodiment of the disclosure, the method disclosed according to various embodiment of the present disclosure may be provided by being included in a computer program product. A computer program product as goods may be dealt between a seller and a buyer. A computer program product may be distributed in the form of a device-readable storage medium (e.g., a compact disc read only memory (CD-ROM)), or through an application store (e.g., PlayStore™) or directly online between two user devices (e.g., smartphones) (e.g., download or upload). For online distribution, at least part of a computer program product (e.g., a downloadable application) may be at least temporarily stored or generated on a device-readable storage medium such as a manufacturer's server, a server of the application store, or a memory of a relay server.

What is claimed is:

1. A robot dockable to a docking station, the robot comprising:
    a driving module;
    a communication module; and
    at least one processor configured to:
        receive, through the communication module, a second docking guidance signal output from a second docking station;
        determine a first output time of the received second docking guidance signal;
        determine a second output time of a first docking guidance request signal to be transmitted from the robot based on the determined first output time to prevent the first docking guidance request signal from overlapping with the second docking guidance signal;
        output the first docking guidance request signal, through the communication module, based on the determined second output time of the first docking guidance request signal;
        in response to the outputting of the first docking guidance request signal from the robot, receive, through the communication module, a first docking guidance signal from the first docking station; and
        dock the robot to the first docking station by driving the driving module in response to receiving the first docking guidance signal.

2. The robot of claim 1, wherein the at least one processor is further configured to determine a period of the second docking guidance signal, and output the first docking guidance request signal in a time interval of the period in which the second docking guidance signal is not output to prevent the first docking guidance request signal from overlapping with the second docking guidance signal.

3. The robot of claim 1, wherein the at least one processor is further configured to determine the second output time of the first docking guidance request signal to prevent the first docking guidance request signal from the robot and the received first docking guidance signal from the first docking station from overlapping with the second docking guidance signal that is output.

4. The robot of claim 1, wherein each of the first docking guidance request signal from the robot and the first docking guidance signal from the first docking station comprises identification information used to dock the robot to the first docking station.

5. The robot of claim 4, wherein the first docking guidance request signal is identified as a signal output by the robot based on the identification information.

6. The robot of claim 4, in response to the receiving of the first docking guidance signal including the identification information by the robot, the first docking guidance signal is identified as a signal output from the first docking station based on the identification information.

7. The robot of claim 4, wherein the first docking guidance signal comprises an infrared signal, and the identification information is included in at least one of a leader signal indicating a start of the infrared signal or a data signal indicating data, of the infrared signal.

8. The robot of claim 4, wherein the identification information is set in the robot through a mobile device that controls the robot.

9. The robot of claim 1, wherein the at least one processor is further configured to determine a docking of a second robot to the second docking station based on whether the second docking guidance signal is output or not, and when the second robot is determined as being docked at the second docking station, output the first docking guidance request signal.

10. The robot of claim 1, wherein the first docking station comprises a plurality of docking portions to respectively dock the robot and a second robot thereto.

11. A method of docking a robot at a docking station, the method comprising:
    determining a first output time of a second docking guidance signal that is output from a second docking station;
    determining a second output time of a first docking guidance request signal to be transmitted from the robot based on the determined first output time to prevent the first docking guidance request signal from overlapping with the second docking guidance signal;
    outputting the first docking guidance request signal from a first robot based on the determined second output time of the first docking guidance request signal;
    in response to the outputting of the first docking guidance request signal from the first robot, receiving a first docking guidance signal from a first docking station;
    docking the first robot to the first docking station in response to the receiving of the first docking guidance signal.

12. The method of claim 11, wherein the determining of the second output time of the first docking guidance request signal comprises determining a period of the second docking guidance signal, and outputting the first docking guidance request signal in a time interval of the period in which the second docking guidance signal is not output to prevent the first docking guidance request signal from overlapping with the second docking guidance signal.

13. The method of claim 11, wherein the determining of the second output time of the first docking guidance request signal comprises determining the second output time of the first docking guidance request signal to prevent the first docking guidance request signal from the first robot to be output and the received first docking guidance signal from the first docking station from overlapping with the second docking guidance signal that is output.

14. The method of claim 11, wherein each of the first docking guidance request signal from the first robot and the first docking guidance signal from the first docking station comprises identification information used to dock the robot to the first docking station.

15. The method of claim 14, wherein the first docking guidance request signal is identified as a signal output by the first robot based on the identification information.

\* \* \* \* \*

UNITED STATES PATENT AND TRADEMARK OFFICE
CERTIFICATE OF CORRECTION

| | | |
|---|---|---|
| PATENT NO. | : 12,135,559 B2 | Page 1 of 1 |
| APPLICATION NO. | : 17/869490 | |
| DATED | : November 5, 2024 | |
| INVENTOR(S) | : Sanghyuk Park et al. | |

It is certified that error appears in the above-identified patent and that said Letters Patent is hereby corrected as shown below:

In the Claims

Column 23, Line 46:
In Claim 1, delete "dock" and insert --docking--.

Signed and Sealed this
Thirty-first Day of December, 2024

Derrick Brent
*Acting Director of the United States Patent and Trademark Office*